US012070949B2

(12) United States Patent
Nakagawa

(10) Patent No.: US 12,070,949 B2
(45) Date of Patent: Aug. 27, 2024

(54) MANUFACTURING METHOD OF LIQUID EJECTING HEAD AND MANUFACTURING METHOD OF FLOW PATH COMPONENT

(71) Applicant: SEIKO EPSON CORPORATION, Tokyo (JP)

(72) Inventor: Naohiro Nakagawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 671 days.

(21) Appl. No.: 17/203,192

(22) Filed: Mar. 16, 2021

(65) Prior Publication Data

US 2021/0291524 A1 Sep. 23, 2021

(30) Foreign Application Priority Data

Mar. 19, 2020 (JP) ................................ 2020-048805

(51) Int. Cl.
*H01L 21/306* (2006.01)
*B41J 2/16* (2006.01)

(52) U.S. Cl.
CPC ........... *B41J 2/1623* (2013.01); *B41J 2/1607* (2013.01); *B41J 2/1626* (2013.01)

(58) Field of Classification Search
CPC ...................... H01L 21/3065; H01L 21/30625
See application file for complete search history.

(56) References Cited

U.S. PATENT DOCUMENTS

| | | | | |
|---|---|---|---|---|
| 11,423,928 | B1 * | 8/2022 | Kautzky | G11B 5/84 |
| 2013/0063525 | A1 * | 3/2013 | Sieber | C23C 16/405 347/45 |
| 2016/0052272 | A1 * | 2/2016 | Kawakubo | B41J 2/14201 29/890.1 |
| 2017/0053826 | A1 * | 2/2017 | Wang | C09G 1/02 |
| 2017/0190179 | A1 | 7/2017 | Menzel et al. | |
| 2017/0197439 | A1 | 7/2017 | Okushima et al. | |
| 2019/0244933 | A1 * | 8/2019 | Or-Bach | H01L 27/0688 |
| 2019/0248138 | A1 | 8/2019 | Menzel et al. | |
| 2020/0135566 | A1 * | 4/2020 | Aketa | H01L 21/7813 |
| 2020/0224332 | A1 * | 7/2020 | Hu | H01L 21/76254 |
| 2021/0245508 | A1 * | 8/2021 | Menzel | B41J 2/1628 |

FOREIGN PATENT DOCUMENTS

| | | |
|---|---|---|
| JP | 2017-124615 | 7/2017 |
| JP | 2019-505411 | 2/2019 |
| JP | 2019-166705 A | 10/2019 |

* cited by examiner

*Primary Examiner* — Thomas T Pham
(74) *Attorney, Agent, or Firm* — WORKMAN NYDEGGER

(57) ABSTRACT

A manufacturing method of a liquid ejecting head which has a nozzle and a liquid flow path having a pressure chamber to which a pressure for ejecting droplets from the nozzle is applied, and where a first flow path substrate and a second flow path substrate are bonded to each other, the method including: a direct bonding step of directly bonding the first flow path substrate and the second flow path substrate without using an adhesive; and a thinning step of making the second flow path substrate thinner than the first flow path substrate after the direct bonding step.

17 Claims, 10 Drawing Sheets

MANUFACTURING METHOD OF LIQUID EJECTING HEAD AND MANUFACTURING METHOD OF FLOW PATH COMPONENT

The present application is based on, and claims priority from JP Application Serial Number 2020-048805, filed Mar. 19, 2020, the disclosure of which is hereby incorporated by reference herein in its entirety.

BACKGROUND

1. Technical Field

The present disclosure relates to a manufacturing method of a liquid ejecting head in which a first flow path substrate and a second flow path substrate are bonded to each other, and a manufacturing method of a flow path component.

2. Related Art

A liquid ejecting head disclosed in JP-A-2019-166705 includes a nozzle plate having a plurality of nozzles, a first flow path substrate having a liquid flow path such as a communication passage connected to each nozzle, a second flow path substrate having a liquid flow path such as a pressure chamber connected to each communication passage, and a protective member in order in a stacking direction. Each of these elements is bonded together by an adhesive.

While it is required to make a flow path substrate having a liquid flow path thin, it is difficult to bond the thin liquid flow path to another substrate with high accuracy. In particular, in a case where a part of a circulation flow path for circulating a liquid is formed in the flow path substrate in order to remove air bubbles from each pressure chamber or suppress stagnation of the liquid in the liquid flow path, it is necessary to make the flow path substrate thin to increase a flow path resistance or increase a flow rate of the circulating liquid.

The problems described above are not limited to the liquid ejecting head, but also exist in various flow path components having a liquid flow path.

SUMMARY

According to an aspect of the present disclosure, there is provided a manufacturing method of a liquid ejecting head which has a nozzle and a liquid flow path having a pressure chamber to which a pressure for ejecting droplets from the nozzle is applied, and where a first flow path substrate and a second flow path substrate are bonded to each other, the method including: a direct bonding step of directly bonding the first flow path substrate and the second flow path substrate without using an adhesive; and a thinning step of making the second flow path substrate thinner than the first flow path substrate after the direct bonding step.

According to another aspect of the present disclosure, there is provided a manufacturing method of a flow path component which has a liquid flow path and where a first flow path substrate and a second flow path substrate are bonded to each other, the method including: a direct bonding step of directly bonding the first flow path substrate and the second flow path substrate without using an adhesive; and a thinning step of making the second flow path substrate thinner than the first flow path substrate after the direct bonding step.

DESCRIPTION OF EXEMPLARY EMBODIMENTS

Figure 1:
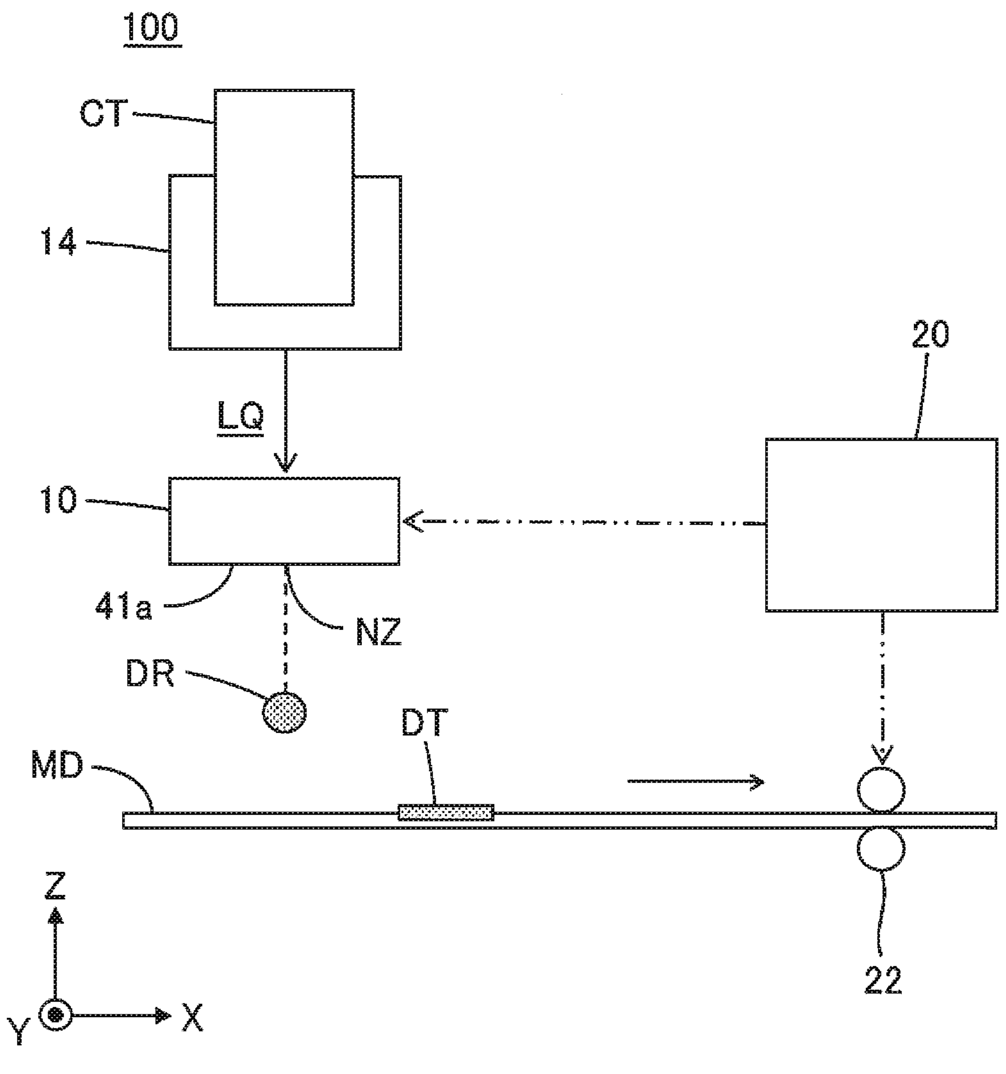
FIG. 1 is a diagram schematically illustrating a configuration example of a liquid ejecting apparatus.

Hereinafter, embodiments of the present disclosure will be described. Of course, the following embodiments merely exemplify the present disclosure, and not all of the features illustrated in the embodiments are essential for the unit for solving the disclosure.

1. Outline of Technology Included in Present Disclosure:

First, an outline of a technology included in the present disclosure will be described. In addition, FIGS. 1 to 10 of the present application are diagrams schematically illustrating examples, and enlargement ratios in each direction illustrated in these drawings may be different, and each of the drawings may not be consistent. Of course, each element of the present technology is not limited to the specific example indicated by the reference numeral. In the "outline of the technology included in the present disclosure", a parenthesis means a supplementary explanation of an immediately preceding word.

Further, in the present application, a numerical range "Min to Max" means a minimum value Min or more and a maximum value Max or less. A composition ratio represented by a chemical formula indicates a stoichiometric ratio, and a material represented by a chemical formula includes a material that deviates from the stoichiometric ratio.

Figure 2:
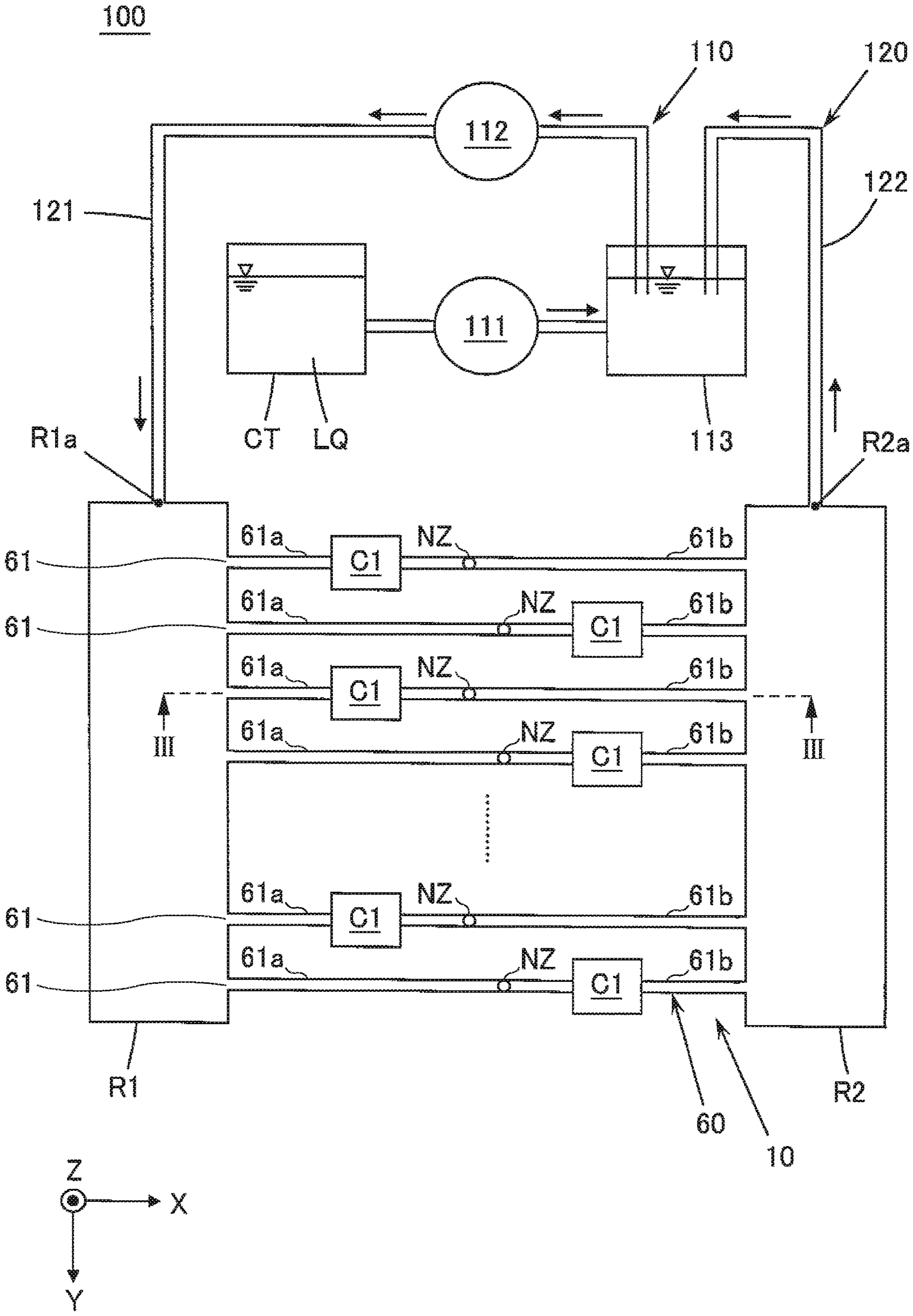
FIG. 2 is a diagram schematically illustrating an example of a circulation flow path of the liquid ejecting apparatus.
Figure 3:
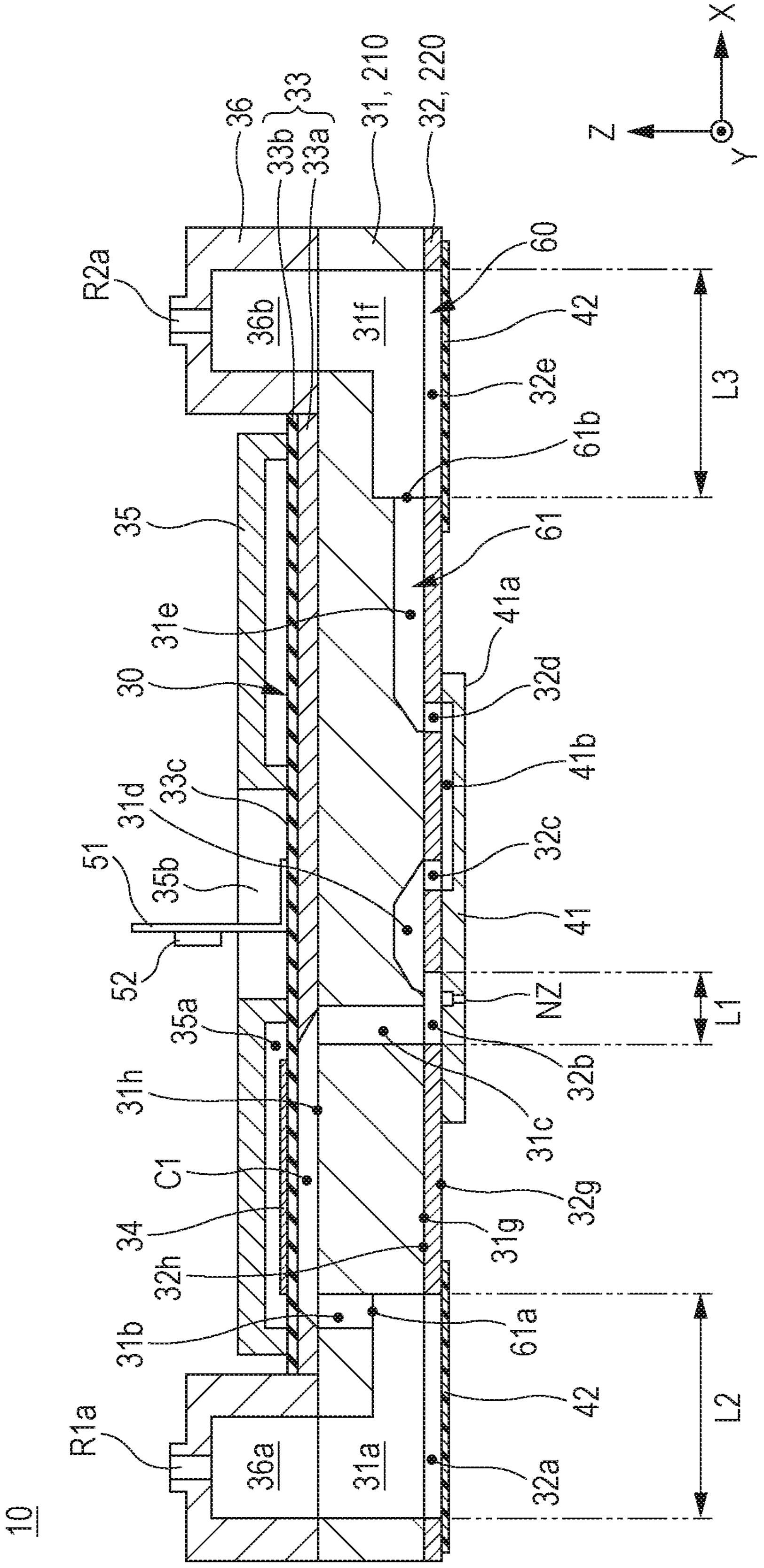
FIG. 3 is a sectional view schematically illustrating an example of a liquid ejecting head at position III-III in FIG. 2.
Figure 5:
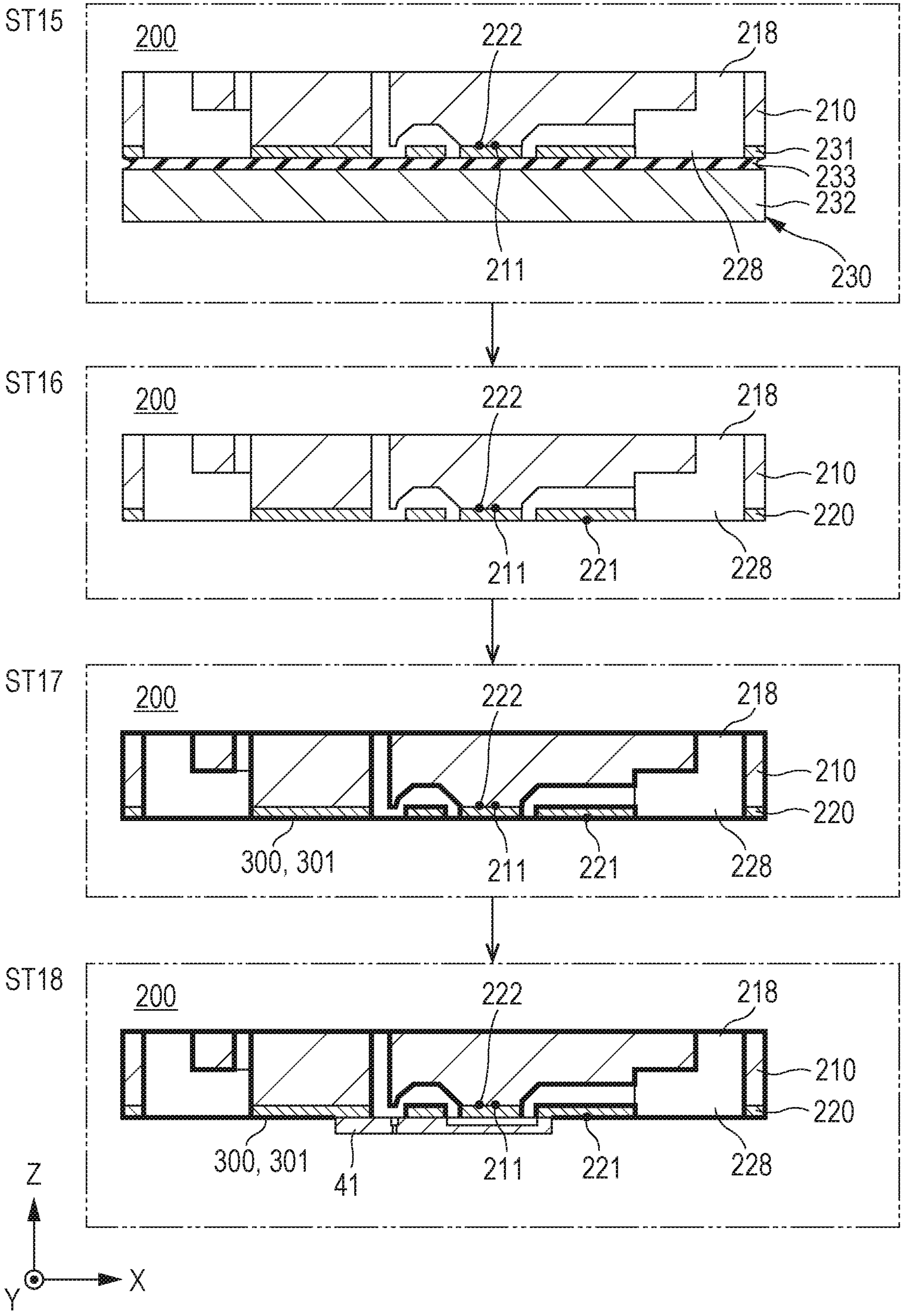
FIG. 5 is a sectional view schematically illustrating an example of manufacturing the liquid ejecting head using the SOI substrate.
Figure 7:
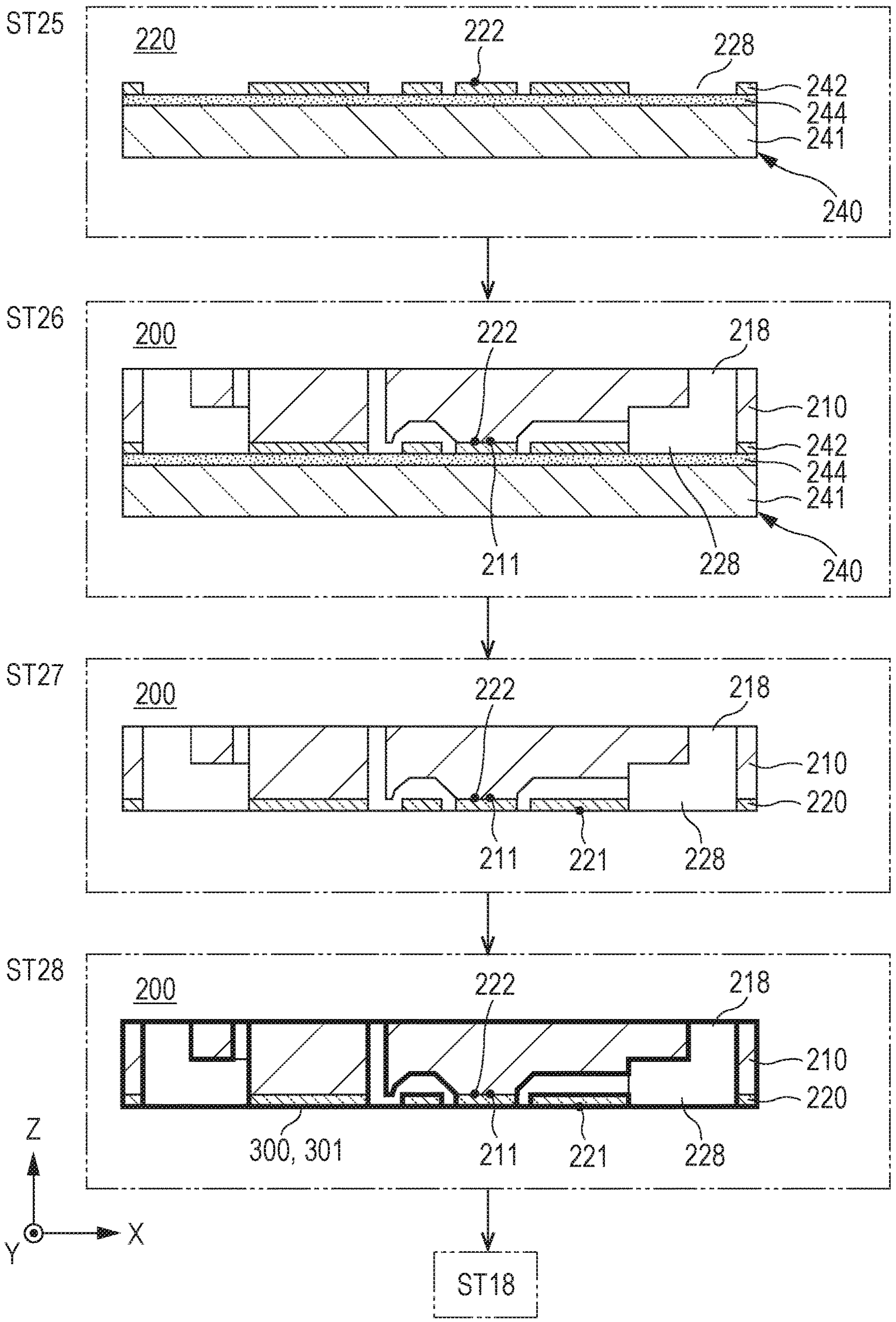
FIG. 7 is a sectional view schematically illustrating an example of manufacturing the liquid ejecting head using the glass substrate.
Figure 8:
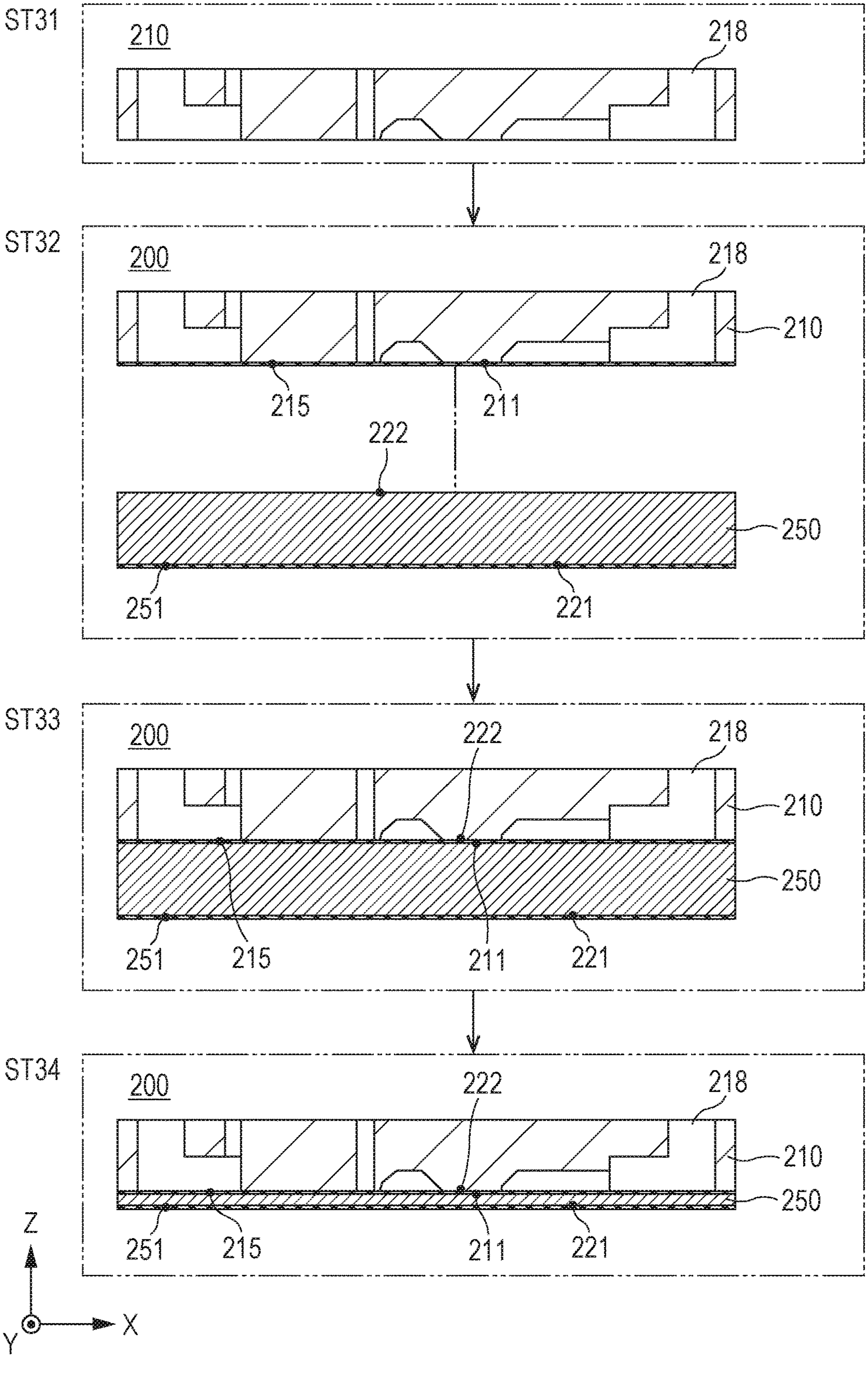
FIG. 8 is a sectional view schematically illustrating an example of manufacturing the liquid ejecting head using a silicon substrate having a silicon oxide layer on a surface.

As illustrated in FIGS. 1 to 3, the liquid ejecting head 10 according to one aspect of the present technology has a nozzle NZ and a liquid flow path 60 including a pressure chamber C1 to which a pressure for ejecting a droplet DR from the nozzle NZ is applied. As illustrated in FIGS. 5, 7 and 8, a manufacturing method according to one aspect of the present technology includes direct bonding steps ST15, ST26, and ST33 of directly bonding a first flow path substrate 210 and a second flow path substrate 220 without using an adhesive, and thinning steps ST16, ST27, and ST34 of making the second flow path substrate 220 thinner than the first flow path substrate 210 after the direct bonding steps ST15, ST26, and ST33.

In the aspect described above, since the first flow path substrate 210 and the second flow path substrate 220 are directly bonded, the second flow path substrate 220 is bonded to the first flow path substrate 210 with high accuracy. Further, since the second flow path substrate 220 is made thin while being in a supported state by the first flow path substrate 210, the thin second flow path substrate 220 having flow paths 32*a* to 32*e* is formed with high accuracy. Therefore, in this aspect, it is possible to manufacture a liquid ejecting head in which a thin layer having a liquid flow path is bonded to another layer with high accuracy.

Further, a flow path component 200 including the first flow path substrate 210 and the second flow path substrate 220 according to one aspect of the present technology has a liquid flow path 60. A manufacturing method according to one aspect of the present technology includes direct bonding steps ST15, ST26, and ST33 of directly bonding the first flow path substrate 210 and the second flow path substrate 220 without using an adhesive, and thinning steps ST16, ST27, and ST34 of making the second flow path substrate 220 thinner than the first flow path substrate 210 after the direct bonding steps ST15, ST26, and ST33.

In the aspect described above, since the first flow path substrate 210 and the second flow path substrate 220 are directly bonded, the second flow path substrate 220 is bonded to the first flow path substrate 210 with high accuracy. Further, since the second flow path substrate 220 is made thin while being in a supported state by the first flow path substrate 210, the thin second flow path substrate 220 having flow paths 32*a* to 32*e* is formed with high accuracy. Therefore, in this aspect, it is possible to manufacture a flow path component in which a thin layer having a liquid flow path is bonded to another layer with high accuracy.

As will be described in detail later, the direct bonding between the first flow path substrate 210 and the second flow path substrate 220 includes room temperature bonding, fusion bonding, or the like.

The first flow path substrate 210 may be bonded to the second flow path substrate 220 in a state of having flow paths 31*a* to 31*f* existing in the final first flow path substrate 210, or may be bonded to the second flow path substrate 220 in the state of not having the flow paths 31*a* to 31*f*.

The second flow path substrate 220 may be bonded to the first flow path substrate 210 in a state of having flow paths 32*a* to 32*e* existing in the final second flow path substrate 220, or may be bonded to the first flow path substrate 210 in the state of not having the flow paths 32*a* to 32*e*.

The second flow path substrate 220 may be a stacked substrate 240 including a glass substrate 241 and a silicon substrate 242. In this case, the direct bonding step ST26 may be a step of directly bonding the first flow path substrate 210 and the silicon substrate 242. The thinning step ST27 may be a step of separating the glass substrate 241 from the stacked substrate 240.

Further, the second flow path substrate 220 may be an SOI substrate 230 including a silicon oxide layer 233 between a first silicon layer 231 and a second silicon layer 232. Here, SOI is an abbreviation for silicon on insulator. In a case where the second flow path substrate 220 is the SOI substrate 230, the direct bonding step ST15 may be a step of directly bonding the first flow path substrate 210 and the first silicon layer 231. The thinning step ST16 may be a step of separating the second silicon layer 232 from the SOI substrate 230.

Further, the second flow path substrate 220 may be a silicon substrate 250 having a silicon oxide layer 251 on a surface. In this case, the direct bonding step ST33 may be a step of directly bonding the first flow path substrate 210 and the silicon oxide layer 251. The thinning step ST34 may be a step of making the silicon substrate thin by one or more types selected from a group of grinding, etching, and CMP from a surface (for example, an end surface 221) of the silicon substrate on a side opposite to a bonding surface (for example, a second surface 222) with the first flow path substrate 210. Here, CMP is an abbreviation for chemical mechanical polishing.

Here, in the present application, the terms "first", "second", "third", . . . are terms for identifying each configuration element included in a plurality of configuration elements having similarities, and do not mean the order.

2. Specific Example of Liquid Ejecting Apparatus:

FIG. 1 schematically illustrates a configuration of a liquid ejecting apparatus 100 including the liquid ejecting head 10. In FIG. 1 or the like, an X-axis, a Y-axis, and a Z-axis are illustrated for convenience of explaining a positional relationship. The X-axis and the Y-axis are orthogonal to each other, the Y-axis and the Z-axis are orthogonal to each other, and the Z-axis and the X-axis are orthogonal to each other. Here, a direction pointed by an arrow in the X-axis is a +X direction, and the opposite direction is a −X direction. A direction pointed by an arrow in the Y-axis is a +Y direction, and the opposite direction is a −Y direction. A direction pointed by an arrow in the Z-axis is a +Z direction, and the opposite direction is a −Z direction. Further, the +X direction and the −X direction are collectively referred to as the X-axis direction, the +Y direction and the −Y direction are collectively referred to as the Y-axis direction, and the +Z direction and the −Z direction are collectively referred to as the Z-axis direction.

The liquid ejecting apparatus 100 illustrated in FIG. 1 includes a supply section 14 of a liquid LQ, the liquid ejecting head 10, a transport section 22 of a medium MD, and a control section 20.

A liquid container CT for storing the liquid LQ is mounted on the supply section 14. As the liquid container CT, a hard container made of synthetic resin, a bag-like soft container formed of a flexible film, a liquid tank capable of replenishing the liquid LQ, or the like can be used. In a case where the liquid LQ is ink, the exchangeable hard container is also called an ink cartridge, and the exchangeable soft container is also called an ink pack. The ink is often a neutral or alkaline liquid, but an acidic ink is used. The supply section 14 supplies the liquid LQ to the liquid ejecting head 10.

The liquid ejecting head 10 ejects the liquid LQ from the nozzle NZ into the medium MD as the droplet DR according to the control by the control section 20. An ejecting direction of the droplet DR is the −Z direction on design. In a case where the medium MD is a printing target, the medium MD as a recording medium is a material that holds a plurality of dots DT formed by a plurality of droplets DR. Paper, synthetic resin, cloth, metal, or the like can be used as the medium MD which is the recording medium. A shape of the medium MD which is the recording medium is not particularly limited, such as a rectangle, a roll shape, a substantially circular shape, a polygon other than the rectangle, or a three-dimensional shape. The liquid ejecting apparatus 100 is called an ink jet printer in a case where a printed image is formed on the medium MD which is the recording medium by ejecting ink droplets as the droplets DR.

The liquid LQ widely includes ink, synthetic resin such as photocurable resin, liquid crystal, etching solution, bioorganic substance, lubricating liquid, and the like. The ink widely includes a solution where a dye or the like is dissolved in a solvent, a sol where solid particles such as pigments and metal particles are dispersed in a dispersion medium, and the like.

The transport section 22 transports the medium MD in the +X direction according to the control by the control section 20. In a case where the liquid ejecting apparatus 100 is a line printer in which the medium MD which is the recording medium is transported at a constant speed when a plurality of droplets DR are ejected onto the medium MD which is the recording medium, a plurality of nozzles NZ of the liquid ejecting head 10 are disposed over an entire medium MD in the Y-axis direction. Further, like a serial printer in which the liquid ejecting head 10 scans a plurality of times and performs recording on the medium MD that is the recording medium, the liquid ejecting apparatus 100 may include a reciprocation drive section that moves the liquid ejecting head 10 in the +Y direction and the −Y direction.

For the control section 20, for example, a circuit including a CPU or a FPGA, a ROM, a RAM, and the like can be used. Here, CPU is an abbreviation for central processing unit, FPGA is an abbreviation for field programmable gate array, ROM is an abbreviation for read only memory, and RAM is an abbreviation for random access memory. Further, the control section 20 may be a circuit including a SoC that is an abbreviation for system on a chip. The control section 20 controls an ejecting operation of the droplet DR from the liquid ejecting head 10 by controlling each section included in the liquid ejecting apparatus 100.

In a case where the liquid ejecting apparatus 100 is an ink jet printer, the medium MD is transported by the transport section 22, and when a plurality of droplets DR ejected from the liquid ejecting head 10 land on the medium MD, a plurality of dots DT are formed on the medium MD. Therefore, a printed image is formed on the medium MD which is the recording medium.

The liquid ejecting apparatus may include a circulation path for circulating the liquid in order to remove air bubbles from the pressure chamber communicating with each nozzle and suppress stagnation of the liquid in the liquid flow path. Hereinafter, an example of the circulation path of the liquid ejecting apparatus will be described with reference to FIG. 2.

FIG. 2 schematically illustrates the circulation flow path 120 of the liquid ejecting apparatus 100. The circulation path 120 illustrated in FIG. 2 includes a plurality of nozzles NZ, individual flow paths 61 connected to each nozzle NZ, a first common liquid chamber R1, a second common liquid chamber R2, a storage container 113, a supply flow path 121, and a return flow path 122. Each individual flow path 61 includes a pressure chamber C1 to which a pressure for ejecting the droplet DR from the nozzle NZ is applied. The liquid flow path 60 of the liquid ejecting head 10 includes a plurality of individual flow paths 61, the first common liquid chamber R1, and the second common liquid chamber R2. Therefore, the liquid flow path 60 is a portion of the liquid flow path in the liquid ejecting head 10 which is a part of the circulation flow path 120 that circulates the liquid LQ passing through the pressure chamber C1.

In the plurality of nozzles NZ illustrated in FIG. 2, the plurality of nozzles NZ form a nozzle row along the Y-axis, and two rows are disposed by shifting the nozzles NZ every other along the X-axis. The plurality of pressure chambers C1 also form a pressure chamber row along the Y-axis, and two rows are disposed by shifting the pressure chambers C1 along the X-axis. Of course, the nozzles and the pressure chambers are not limited to being disposed as illustrated in FIG. 2. Various dispositions are possible, such as a case where only one row of the nozzles NZ is provided along the Y-axis in the flow path connecting the first common liquid chamber R1 and the second common liquid chamber R2 and does not shift along the X-axis, and every two nozzles are disposed in three rows of the nozzles NZ with positions thereof along the X-axis shifted.

Each individual flow path 61 has a shape extending in the X-axis direction when viewed in the −Z direction. The pressure chamber C1 included in the individual flow path 61 is a space for storing the liquid LQ ejected from the nozzle NZ communicating with the individual flow path 61. As the pressure of the liquid LQ in the pressure chamber C1 changes, the droplet DR is ejected from the nozzle NZ. One end portion 61*a* of the individual flow path 61 is connected to the first common liquid chamber R1. The other end portion 61*b* of the individual flow path 61 is connected to the second common liquid chamber R2. Therefore, the plurality of individual flow paths 61 are located between the first common liquid chamber R1 and the second common liquid chamber R2 in the X-axis direction.

The first common liquid chamber R1 has a shape extending in the Y-axis direction and is disposed over an entire area where the plurality of nozzles NZ exist in the Y-axis direction. The first common liquid chamber R1 is provided with a supply port R1*a* to which the end portion 61*a* of each individual flow path 61 is coupled and the liquid LQ is supplied from the supply flow path 121.

The second common liquid chamber R2 has a shape extending in the Y-axis direction, and is disposed over an entire area where the plurality of nozzles NZ exist in the Y-axis direction. The second common liquid chamber R2 is provided with a discharge port R2*a* to which the end portion 61*b* of each individual flow path 61 is coupled and where the liquid LQ is returned to the return flow path 122.

From the above, the liquid LQ supplied from the first common liquid chamber R1 to each individual flow path 61 is ejected from the nozzle NZ corresponding to the individual flow path 61. Further, a liquid of the liquid LQ supplied from the first common liquid chamber R1 to each individual flow path 61, which is not ejected from the nozzle NZ, is discharged to the second common liquid chamber R2.

The liquid ejecting apparatus 100 includes a circulation mechanism 110 that circulates the liquid LQ in the circulation flow path 120. The circulation mechanism 110 recirculates the liquid LQ, which is discharged from each individual flow path 61 to the second common liquid chamber R2, to the first common liquid chamber R1. The circulation mechanism 110 illustrated in FIG. 2 includes a first supply pump 111 and a second supply pump 112.

The first supply pump 111 supplies the liquid LQ stored in the liquid container CT to the storage container 113. The storage container 113 is a sub-tank that temporarily stores the liquid LQ supplied from the liquid container CT. The storage container 113 is connected to the supply flow path 121 that reaches the supply port R1*a* of the first common liquid chamber R1 via the second supply pump 112 and a return flow path 122 that reaches the discharge port R2*a* of the second common liquid chamber R2. The second supply pump 112 sends the liquid LQ stored in the storage container 113 to the supply port R1*a* along the supply flow path 121. Therefore, the liquid LQ is supplied from the storage container 113 to the first common liquid chamber R1. The liquid LQ stored in the liquid container CT is supplied to the storage container 113 by driving of the first supply pump 111, and the liquid LQ discharged from each individual flow path 61 to the second common liquid chamber R2 is supplied via the return flow path 122.

3. Specific Example of Liquid Ejecting Head:

FIG. 3 is a sectional view schematically illustrating the liquid ejecting head 10 at position III-III in FIG. 2. In addition, bonding the first member and the second member includes bonding the first member and the second member in a state where at least one film such as a protective film is stacked on at least one of the first member and the second member.

The liquid ejecting head 10 illustrated in FIG. 3 includes a nozzle substrate 41, a compliance substrate 42, a first communication substrate 31, a second communication substrate 32, a pressure chamber substrate 33 provided with a vibration plate 33*b*, a drive element 34, and a space of the pressure chamber C1, a protective substrate 35, a housing member 36, and a wiring substrate 51. Here, the communication substrates 31 and 32, the pressure chamber substrate 33, the nozzle substrate 41, and the compliance substrate 42 are collectively referred to as a flow path structure 30. The flow path structure 30 is a structure having the liquid flow path 60 inside thereof for supplying the liquid LQ to each nozzle NZ. Each member included in the flow path structure 30 is a long plate-like member of which a longitudinal direction is along the Y-axis. The liquid ejecting head 10 includes the nozzle substrate 41, the compliance substrate 42, the second communication substrate 32, the first communication substrate 31, the pressure chamber substrate 33, and the protective substrate 35 in order in the +Z direction at a position passing through the protective substrate 35 in the X-axis direction.

The nozzle substrate 41 is a plate-like member bonded to the end surface 32*g* of the second communication substrate 32 in the −Z direction, and has a plurality of nozzles NZ for ejecting liquid LQ. The Z-axis direction is a thickness direction of the nozzle substrate 41. The nozzle substrate 41 illustrated in FIG. 2 has nozzle rows in which the plurality of nozzles NZ aligned in the Y-axis direction are disposed in two rows in the X-axis direction. Therefore, the Y-axis direction is a nozzle alignment direction. Here, as illustrated in FIGS. 1 and 3, a surface on the nozzle substrate 41 on which the droplet DR is ejected is referred to as a nozzle surface 41*a*. Each nozzle NZ is connected to the flow path 32*b* of the second communication substrate 32 and penetrates the nozzle substrate 41 in the Z-axis direction which is a thickness direction of the nozzle substrate 41. There are a plurality of opened nozzles NZ on the nozzle surface 41*a*. Therefore, the nozzle NZ is also called nozzle opening. The nozzle substrate 41 illustrated in FIG. 2 also has a flow path 41*b* which is a part of the individual flow path 61. The nozzle substrate 41 can be formed of one or more materials selected from, for example, a silicon substrate, metal such as stainless steel, and the like. The nozzle substrate 41 is formed by processing a silicon single crystal substrate by using, for example, a semiconductor manufacturing technology such as photolithography and etching. Of course, a known material and manufacturing method can be optionally adopted for forming the nozzle substrate 41.

A liquid-repellent film having a liquid-repellent property may be provided on the nozzle surface 41*a*. The liquid-repellent film is not particularly limited as long as it has the liquid-repellent property against a liquid, and for example, a metal film containing a fluorine-based polymer, a molecular film of metal alkoxide having the liquid-repellent property, and the like can be used.

The compliance substrate 42 is bonded to the end surface 32*g* of the second communication substrate 32 on the outside of the nozzle substrate 41. The compliance substrate 42 illustrated in FIG. 3 seals the first common liquid chamber R1 and the second common liquid chamber R2 common to the plurality of nozzles NZ. The compliance substrate 42 includes, for example, a flexible sealing film. As the sealing film, for example, a flexible film having a thickness of 20 μm or less can be used, and polyphenylene sulfide abbreviated as PPS, stainless steel, or the like can be used. The compliance substrate 42 constitutes wall surfaces of the first common liquid chamber R1 and the second common liquid chamber R2, and absorbs a pressure fluctuation of the liquid LQ of the first common liquid chamber R1 and the second common liquid chamber R2.

The second communication substrate 32 is disposed between the nozzle substrate 41, the compliance substrate 42, and the first communication substrate 31. The Z-axis direction is the thickness direction of the second communication substrate 32. The first communication substrate 31 is bonded to the end surface 32*h* of the second communication substrate 32 in the +Z direction. The second communication substrate 32 has a flow path 32*a* common to the plurality of nozzles NZ, flow paths 32*b*, 32*c*, and 32*d* which are a part of individual flow path 61, and a flow path 32*e* common to the plurality of nozzles NZ. The flow path 32*a* is a part of the first common liquid chamber R1. The flow path 32*e* is a part of the second common liquid chamber R2. The flow paths 32*a* and 32*e* have a shape having a long opening of which a longitudinal direction is along the Y-axis. Each flow path 32*b* communicates the flow path 31*b* of the first communication substrate 31 with the nozzle NZ, and communicates the nozzle NZ with the pressure chamber C1. Each flow path 32*c* communicates the pressure chamber C1 with the flow path 41*b* of the nozzle substrate 41. Each flow path 32*d* communicates the flow path 41*b* of the nozzle substrate 41 with the flow path 31*d* of the first communication substrate 31.

The second communication substrate 32 can be formed of, for example, one or more materials selected from a silicon substrate, metal, ceramic, and the like. The second communication substrate 32 is formed by processing a silicon single crystal substrate by using, for example, a semiconductor manufacturing technology such as photolithography and etching.

The first communication substrate 31 is disposed between the second communication substrate 32, the pressure chamber substrate 33, and the housing member 36. The Z-axis direction is the thickness direction of the first communication substrate 31. The pressure chamber substrate 33 and the housing member 36 are bonded to the end surface 31*h* of the first communication substrate 31 in the +Z direction. The first communication substrate 31 has the flow path 31*a* common to the plurality of nozzles NZ, the flow paths 31*b*, 31*c*, 31*d*, and 31*e* which are a part of the individual flow path 61, and the flow path 31*f* common to the plurality of nozzles NZ. The flow path 31*a* is a part of the first common liquid chamber R1. The flow path 31*f* is a part of the second common liquid chamber R2. The flow paths 31*a* and 31*f* have a shape having a long opening of which the longitudinal direction is along the Y-axis. Each flow path 31*b* communicates the first common liquid chamber R1 with the pressure chamber C1. Each flow path 31*c* communicates the pressure chamber C1 with the flow path 32*b* of the second communication substrate 32. Each flow path 31*d* communicates the flow path 32*b* with the flow path 32*c* in the second communication substrate 32. Each flow path 31*e* communicates the flow path 32*d* of the second communication substrate 32 with the second common liquid chamber R2.

The first communication substrate 31 can be formed of, for example, one or more materials selected from a silicon substrate, metal, ceramic, and the like. The first communication substrate 31 is formed by processing a silicon single crystal substrate by using, for example, a semiconductor manufacturing technology such as photolithography and etching.

The pressure chamber substrate 33 has a plurality of pressure chambers C1 where the pressure for ejecting the liquid LQ from the nozzle NZ is applied to the liquid LQ. The pressure chamber substrate 33 includes a vibration plate 33*b* and a drive element 34 on a surface on a side opposite to the first communication substrate 31. Here, a portion of the pressure chamber substrate 33 in the −Z direction with respect to the vibration plate 33*b* is referred to as a pressure chamber substrate main body section 33*a*.

The pressure chamber substrate main body section 33*a* is bonded to the end surface 31*h* of the first communication substrate 31 in the +Z direction. The pressure chamber substrate main body section 33*a* has the pressure chamber C1 separated for each nozzle NZ. Each pressure chamber C1 is located between the second communication substrate 32 and the vibration plate 33*b*, and is a long space of which a longitudinal direction is along the X-axis. The pressure chamber substrate main body section 33*a* has a pressure chamber row in which a plurality of pressure chambers C1 are aligned in the Y-axis direction in two rows in the X-axis direction. Each pressure chamber C1 is connected to the flow path 31*b* of the first communication substrate 31 on one end side in the longitudinal direction, and is connected to the flow path 31*c* of the first communication substrate 31 on the other end side in the longitudinal direction.

The pressure chamber substrate main body section 33*a* can be formed of, for example, one or more materials selected from a silicon substrate, metal, ceramic, and the like. The pressure chamber substrate main body section 33*a* is formed by processing a silicon single crystal substrate by using, for example, a semiconductor manufacturing technology such as photolithography and etching. In this case, if a silicon oxide layer is formed on a surface of the silicon single crystal substrate by thermal oxidation or the like, the silicon oxide layer can be used for the vibration plate 33*b*. Of course, a known material and manufacturing method can be optionally adopted for forming the pressure chamber substrate main body section 33*a*.

The vibration plate 33*b* integrated with the pressure chamber substrate main body section 33*a* has elasticity and forms a part of the wall surface of the pressure chamber C1. The vibration plate 33*b* can be formed of, for example, one or more materials selected from silicon oxide abbreviated as SiOx, metal oxide, ceramic, synthetic resin, and the like. SiOx is silicon dioxide $SiO_2$ in stoichiometric ratio, but it may actually deviate from x=2. The vibration plate 33*b* can be formed by, for example, a physical vapor deposition method including thermal oxidation and sputtering, a vapor deposition method including CVD, a liquid phase method including spin coating, and the like. Here, CVD is an abbreviation for chemical vapor deposition.

The vibration plate 33*b* may include a plurality of layers such as an elastic layer and an insulating layer. For example, the vibration plate 33*b* is formed by stacking SiOx as an elastic layer on the pressure chamber substrate main body section 33*a* and stacking zirconium oxide abbreviated as ZrOx as an insulating layer on the elastic layer.

Of course, in addition to the above description, the material of the vibration plate 33*b* may be silicon nitride abbreviated as SiNx, titanium oxide abbreviated as TiOx, aluminum oxide abbreviated as AlOx, hafnium oxide abbreviated as HfOx, magnesium oxide abbreviated as MgOx, lanthanum aluminate, or the like.

The drive element 34 of which drive is divided for each pressure chamber C1 is integrated with a drive element disposition surface 33*c* which is an end surface of the vibration plate 33*b* in the +Z direction. The drive element 34 and the vibration plate 33*b* are included in an actuator that applies a pressure to the pressure chamber C1. Each drive element 34 is a long structure of which a longitudinal direction is along the X-axis. It is assumed that each drive element 34 of this specific example is a piezoelectric element that expands or contracts according to a drive signal including repetition of a drive pulse having a voltage change. The piezoelectric element includes, for example, a layered first electrode, a piezoelectric layer, and a layered second electrode in order in the +Z direction, and expands or contracts according to a voltage applied between the first electrode and the second electrode. In the plurality of drive elements 34, at least one layer of the first electrode, the piezoelectric layer, and the second electrode may be individually divided between the drive elements 34. Therefore, in the plurality of drive elements 34, the common electrode to which the first electrode is connected may be used, the common electrode to which the second electrode is connected may be used, or the piezoelectric layer may be connected. The first electrode and the second electrode can be formed of, for example, a conductive material such as a metal such as iridium or platinum, or a conductive metal oxide such as indium tin oxide abbreviated as ITO. The piezoelectric layer can be formed of, for example, a material having a perovskite structure such as lead zirconate titanate abbreviated as PZT, a relaxer ferroelectric in which any metal such as niobium or nickel is added to PZT, and a lead-free perovskite oxide such as BiFeOx-BaTioy piezoelectric material.

The drive element 34 is not limited to the piezoelectric element, and may be a heat generating element or the like that generates air bubbles in the pressure chamber due to heat generation.

The protective substrate 35 has a space 35*a* for protecting a plurality of drive elements 34 and a through-hole 35*b* for pulling out the wiring substrate 51, and is bonded to the drive element disposition surface 33*c* which is an end surface of the vibration plate 33*b* in the +Z direction. Therefore, the protective substrate 35 reinforces a mechanical strength of the pressure chamber substrate 33. The protective substrate 35 can be formed of, for example, one or more materials selected from a silicon substrate, metal, ceramic, synthetic resin, and the like. The protective substrate 35 is formed by processing a silicon single crystal substrate by using, for example, a semiconductor manufacturing technology such as photolithography and etching. Of course, a known material and manufacturing method can be optionally adopted for forming the protective substrate 35.

The housing member 36 is bonded to the end surface 31*g* of the first communication substrate 31 in the +Z direction on the outside of the pressure chamber substrate 33 and the protective substrate 35. The housing member 36 illustrated in FIG. 3 has a space 36*a* common to the plurality of nozzles NZ, a supply port R1*a* connected to the supply flow path 121 from the space 36*a*, a space 36*b* common to the plurality of nozzles NZ, and a discharge port R2*a* connected to the return flow path 122 from the space 36*b*. The space 36*a* is a part of the first common liquid chamber R1. The space 36*b* is a part of the second common liquid chamber R2. The spaces 36*a* and 36*b* have a shape having a long opening of which a longitudinal direction is along the Y-axis. The housing member 36 can be formed of, for example, one or more materials selected from a synthetic resin, metal, ceramic, and the like. The housing member 36 is formed, for example, by injection molding of synthetic resin. Of course, a known material and manufacturing method can be optionally adopted for forming the housing member 36.

The wiring substrate 51 is a flexible mounting component including the drive circuit 52 of the drive element 34, and is coupled to the end surface of the vibration plate 33*b* in the +Z direction between the drive element rows. A coupling portion of the wiring substrate 51 with respect to the vibration plate 33*b* is, for example, coupled to the first electrode and the second electrode via lead wiring. For the wiring substrate 51, FPC, FFC, COF, or the like can be used. Here, FPC is an abbreviation for a flexible printed circuit. FFC is an abbreviation for a flexible flat cable. COF is an abbreviation for a chip on film. A drive signal and a reference voltage for driving the drive element 34 are supplied from the wiring substrate 51 to each drive element 34. As a constituent metal of the lead wiring, one or more of Au, Pt, Al, Cu, Ni, Cr, Ti, and the like can be used. The lead wiring may include an adhesion layer such as nichrome abbreviated as NiCr.

As illustrated in FIGS. 2 and 3, the liquid LQ flowing out from the storage container 113 by the second supply pump 112 flows through the supply flow path 121, the supply port R1*a*, the first common liquid chamber R1, the individual flow path 31*b*, the individual pressure chamber C1, the individual flow path 31*c*, the individual flow path 32*b*, and the individual nozzle NZ in order. When the pressure chamber C1 is contracted so that the drive element 34 ejects the droplet DR, the droplet DR is ejected from the nozzle NZ in the −Z direction. The remaining liquid LQ returns to the storage container 113 via the individual flow path 31*d*, the individual flow path 32*c*, the individual flow path 41*b*, the individual flow path 32*d*, the individual flow path 31*e*, the second common liquid chamber R2, the discharge port R2*a*, and the return flow path 122.

As described above, the liquid flow path 60 including a part of the circulation flow path 120 for circulating the liquid LQ passing through the pressure chamber C1 has a complicated structure.

By the way, the second communication substrate 32 to which the nozzle substrate 41 is bonded has a flow path which has a very thin thickness, for example, about 20 to 100 μm, which is a length in the +Z direction, and is longer than its own thickness in a direction orthogonal to the +Z direction. For example, a length L1 of the longest flow path in the individual flow path 61 is about 100 to 200 μm in a range longer than the thickness of the second communication substrate 32. The length L1 is a length in the X-axis direction orthogonal to the +Z direction which is the thickness direction of the second communication substrate 32. The length L2 of the first common liquid chamber R1 in the X-axis direction is about 400 to 600 μm, and the length L3 of the second common liquid chamber R2 in the X-axis direction is also about 400 to 600 μm. Further, the length of the first common liquid chamber R1 in the Y-axis direction is about 20 to 30 mm, and the length of the second common liquid chamber R2 in the Y-axis direction is also about 20 to 30 mm. That is, the second communication substrate 32 has a flow path longer than the thickness of the second flow path substrate 220 as a part of the circulation flow path 120. Therefore, it is difficult to bond the thin second communication substrate having a long flow path to the first communication substrate with high accuracy. In particular, in a case where the second communication substrate has a part of the circulation flow path, it is necessary to make the second communication substrate thin in order to increase a flow path resistance and a flow rate of the circulating liquid.

Therefore, in this specific example, after the first communication substrate and the second communication substrate are directly bonded to each other without using the adhesive, the second communication substrate is made thinner than the first communication substrate. The first communication substrate 31 is an example of a first flow path substrate, and the second communication substrate 32 is an example of a second flow path substrate. Hereinafter, an example of a manufacturing method of the liquid ejecting head 10 including the flow path component 200 where the first flow path substrate 210 and the second flow path substrate 220 are bonded will be described with reference to FIGS. 4 to 10.

Figure 4:
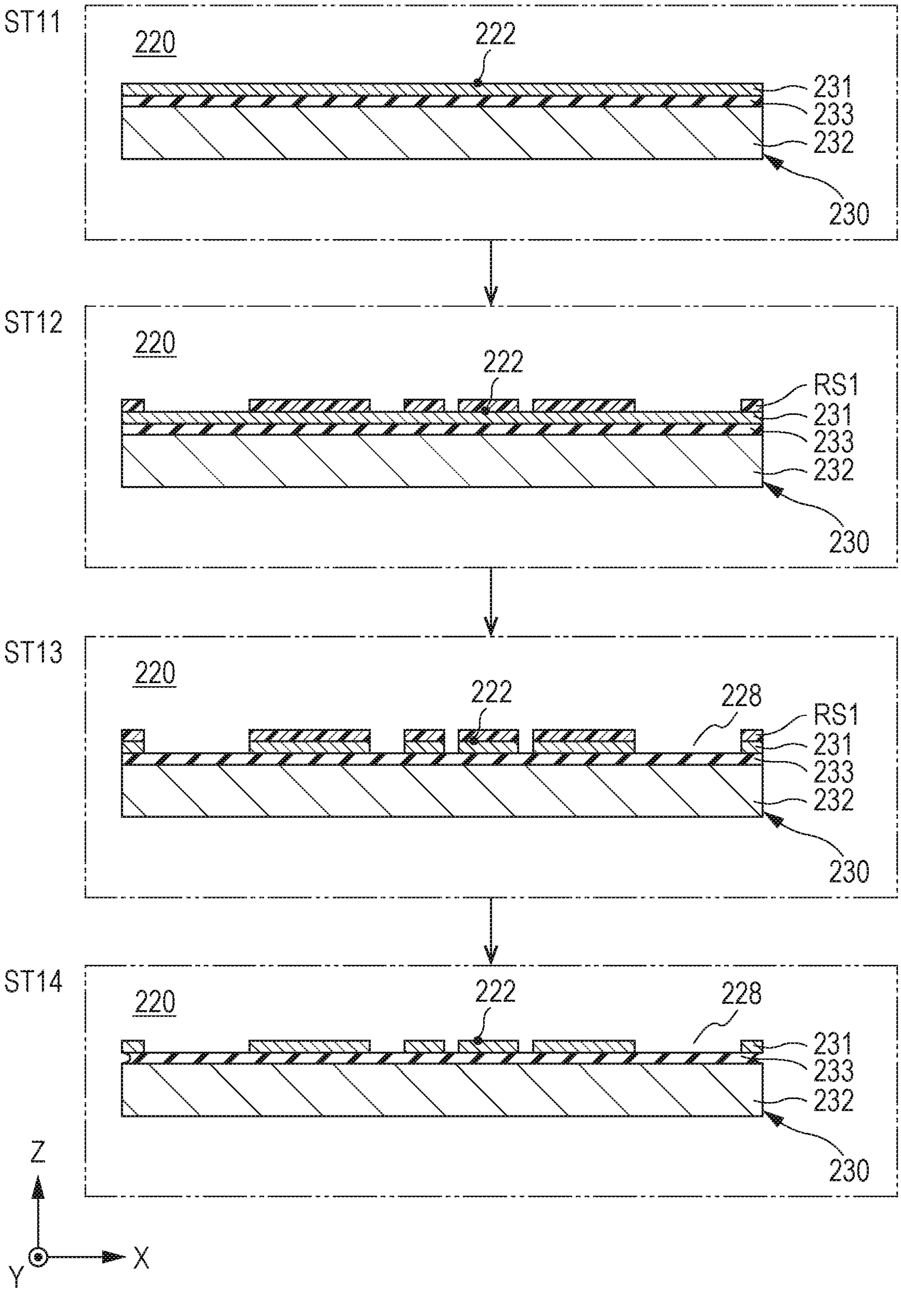
FIG. 4 is a sectional view schematically illustrating an example of manufacturing the liquid ejecting head using an SOI substrate.

4. First Specific Example of Manufacturing Method of Liquid Ejecting Head:

FIGS. 4 and 5 are sectional views schematically illustrating an example in which the liquid ejecting head 10 is manufactured by using the SOI substrate 230 including the silicon oxide layer 233 between the first silicon layer 231 and the second silicon layer 232 as the second flow path substrate 220. The manufacturing method illustrated in FIGS. 4 and 5 includes steps ST11 to ST18.

First, as the SOI substrate 230 used in a SOI thinning step ST11 illustrated in FIG. 4, a SOI substrate preparation step is performed in which the SOI substrate having a surface index of (110) for the first silicon layer 231 of the single crystal and the second silicon layer 232 of the single crystal is prepared. The silicon oxide SiOx of the silicon oxide layer 233 is silicon dioxide $SiO_2$ in the stoichiometric ratio, but it may actually deviate from x=2. The thickness of the silicon oxide layer 233 is preferably 0.5 μm or more, more preferably 1 μm or more, from a viewpoint of separating the second silicon layer 232 from the SOI substrate 230 in a thinning step ST16 described later. Further, the thickness of the silicon oxide layer 233 is preferably 10 μm or less, more preferably 5 μm or less, from a viewpoint of suppressing the occurrence of warpage or cracks in the second flow path substrate 220 due to a film stress of the silicon oxide layer 233. The formation of the silicon oxide layer 233 on the silicon substrate is preferably thermal oxidation at about 800 to 1200° C., and wet oxidation is preferable to dry oxidation.

The first flow path substrate 210 bonded to the second flow path substrate 220 is preferably formed from a silicon single crystal substrate. In the first flow path substrate 210 illustrated in FIG. 5, the liquid flow path 218 is formed as the flow paths 31*a* to 31*f* by etching via a mask. An alkaline solution such as an aqueous solution of potassium hydroxide, an aqueous solution of tetramethylammonium hydroxide abbreviated as TMAH, or an aqueous solution of ethylenediamine pyrocatel abbreviated as EDP can be used as an etchant for forming the liquid flow path 218 on the silicon substrate.

After the SOI substrate preparation step, an SOI thinning step ST11 is performed in which the first silicon layer 231 of the SOI substrate 230 is made thin according to the thickness of the second flow path substrate 220, for example, about 20 to 100 μm. In the first silicon layer 231, the second surface 222, which is the end surface in the +Z direction, is scraped. The first silicon layer 231 can be made thin by one or more types selected from CMP, grinding, and etching. Here, CMP is an abbreviation for chemical mechanical polishing. The etching may be wet etching or dry etching.

A surface roughness Ra of the second surface 222 to which the first flow path substrate 210 is bonded in the subsequent direct bonding step ST15 is preferably 1 nm or less. Therefore, it is preferable to form a so-called mirror surface on the second surface 222 by performing a CMP treatment with a CMP apparatus. Further, in a case of combining grinding and CMP or combining etching and CMP, it is preferable to form a mirror surface by finally performing the CMP treatment on the second surface 222.

Next, a mask forming step ST12 is performed in which a pattern of the resist mask RS1 is formed by using photolithography on a portion of the second surface 222 of the first silicon layer 231, where the flow paths 32*a* to 32*e* are not formed.

Next, a second liquid flow path forming step ST13 is performed in which the liquid flow path 228 is formed as the flow paths 32*a* to 32*e* in the first silicon layer 231 by etching the first silicon layer 231 using the silicon oxide layer 233 as an etching stop layer. A second liquid flow path forming step ST13 is an example of a liquid flow path forming step of forming a flow path longer than the thickness of the second flow path substrate on the second flow path substrate. The etching of the first silicon layer 231 may be wet etching or dry etching. For the wet etching, for example, anisotropic etching can be used by using an alkaline solution such as potassium hydroxide aqueous solution, TMAH aqueous solution, or EDP aqueous solution as an etchant. For the dry etching, for example, plasma dry etching can be used. In the second liquid flow path forming step ST13, a flow path longer than the thickness of the second flow path substrate 220 in a direction orthogonal to the Z-axis direction is formed on the second flow path substrate 220 as a part of the circulation flow path 120. By performing the second liquid flow path forming step ST13 of forming the flow path longer than the thickness of the second flow path substrate 220 in a direction intersecting the Z-axis direction as the flow paths 32*a* to 32*e* on the second flow path substrate 220, a flow path design of a narrow flow path portion near the nozzle NZ becomes easy. Further, since the flow path longer than the thickness of the second flow path substrate 220 is a part of the circulation flow path 120, in addition to facilitating the flow path design of the narrow flow path portion near the nozzle NZ, a design of the circulation flow path 120 or the like becomes easy.

Next, a mask removing step ST14 is performed in which the resist mask RS1 is removed from the second surface 222. The resist mask RS1 can be removed by a chemical solution, oxygen plasma, or the like.

Next, as illustrated in FIG. 5, a direct bonding step ST15 is performed in which the first surface 211 of the first flow path substrate 210 and the second surface 222 of the second flow path substrate 220 are directly bonded to each other without using the adhesive. If the first flow path substrate and the second flow path substrate are bonded with the adhesive, an adhesive strength may decrease due to the deterioration of the adhesive depending on a type of the liquid and a usage environment, and ejection characteristics of the droplets may deteriorate. By directly bonding the first flow path substrate 210 and the second flow path substrate 220 without using the adhesive, durability of a flow path component by which the substrates are bonded is improved, and good droplet ejection characteristics are maintained for a long period of time, and it is possible to form a complicated flow path structure that has a liquid circulation path or does not have a circulation path but is necessary for a high-density nozzle disposition.

It is preferable that the first surface 211, which is the end surface of the first flow path substrate 210 having the liquid flow path 218 in the −Z direction, is subjected to CMP in order to obtain a mirror surface. Further, in a case where the first surface 211 is scraped by combining grinding and CMP, or combining etching and CMP, it is preferable to use CMP finally. The direct bonding includes room temperature bonding, fusion bonding, or the like.

The room temperature bonding is performed, for example, as follows.

When the first surface 211 of the first flow path substrate 210 and the second surface 222 of the second flow path substrate 220 are irradiated with either an ion beam or a neutron beam under a high vacuum of $10^{-5}$ to $10^{-1}$ Pa, silicon bonding hands appear on the first surface 211 and the second surface 222, and the first surface 211 and the second surface 222 are in an activated state. For the ion beam, for example, ions of an inert gas such as argon are used. In a state where the first surface 211 and the second surface 222 are activated, when the activated first surface 211 and the activated second surface 222 are in contact with each other, the bonding hands are tied together, and the first surface 211 and the second surface 222 are bonded. Therefore, in theory, a strength comparable to that of the silicon substrate itself can be obtained. The direct bonding treatment is performed at room temperature.

That is, in the manufacturing method of this specific example, in the direct bonding step ST15, the first surface 211 of the first flow path substrate 210 and the second surface 222 of the second flow path substrate 220 are irradiated with the ion beam and the neutron beam under vacuum so that the first surface 211 and the second surface 222 are activated, and the activated first surface 211 and the activated second surface 222 are in contact with each other to bond the first surface 211 and the second surface 222. Since the room temperature bonding does not require heating or a high temperature, the bonding position is unlikely to shift. Further, since gas is rarely generated at the bonding surface between the flow path substrates, voids are unlikely to occur at the bonding surface. Therefore, the room temperature bonding is a preferable direct bonding.

The fusion bonding is a method in which the first surface 211 and the second surface 222 are in close contact with each other by a hydrogen bond between hydroxyl groups in a state where the hydroxyl groups are formed on the first surface 211 and the second surface 222, and the direct bonding is realized with oxygen by a high temperature treatment. For example, when a silicon oxide layer is formed on the first surface 211 and the second surface 222, hydroxyl groups are formed on the first surface 211 and the second surface 222 due to the moisture in the air. In this state, when the first surface 211 and the second surface 222 are in close contact with each other and then heated to a high temperature of 800° C. or higher, preferably about 1200° C., an oxygen-mediated direct bond of Si—O—Si is formed.

Plasma activation bonding can also be provided, which lowers the bonding temperature by a hydrophilization treatment of the first surface 211 and the second surface 222, that is, the first surface 211 and the second surface 222 are irradiated with plasma of oxygen or nitrogen in advance in order to lower a heating temperature. The plasma activation bonding is a type of the fusion bonding, and the heating temperature can be about 200 to 300° C.

That is, in the manufacturing method of this specific example, in the direct bonding step ST15, the hydroxyl groups are formed on the first surface 211 of the first flow path substrate 210 and the second surface 222 of the second flow path substrate 220. The first surface 211 and the second surface 222 are bonded by heating in a state where the first surface 211 having the hydroxyl group and the second surface 222 having the hydroxyl group are in contact with each other. The fusion bonding is a preferable direct bonding because the first surface 211 and the second surface 222 have a high bonding force, so that the first surface 211 and the second surface 222 can be easily bonded, and a high vacuum is not required. In particular, the plasma activation bonding is a more preferable direct bonding because it does not require a high temperature of 800° C. or higher.

After the second liquid flow path forming step ST13, the direct bonding step ST15 is performed in which the first flow path substrate 210 and the first silicon layer 231 are directly bonded to each other without using the adhesive so that bending of the second flow path substrate 220 is suppressed. Therefore, in this specific example, the liquid flow path 228 can be precisely processed while preventing the second flow path substrate 220 from warpage or the like, and the liquid flow path 228 can be formed with high accuracy.

After the direct bonding step ST15, the thinning step ST16 is performed in which the second flow path substrate 220 is made thinner than the first flow path substrate 210 with respect to the flow path component 200 where the first flow path substrate 210 and the second flow path substrate 220 are directly bonded. The thinning step ST16 can be performed, for example, by dissolving the silicon oxide layer 233 with an etchant and separating the second silicon layer 232 from the SOI substrate 230. The second silicon layer 232 is separated from the SOI substrate 230 by, for example, one of wet etching using fluorinated acid that is, hydrofluoric acid as an etchant, etching with hydrofluoric acid vapor, a combination of grinding and the above-mentioned wet etching, and the like.

In this specific example in which the thinning step ST16 described above is performed, the second silicon layer 232 having no liquid flow path can be removed from the flow path component 200 without deteriorating the liquid flow path 60 of the flow path component 200.

As described above, in the manufacturing method of this specific example, in the thinning step ST16, the second flow path substrate 220 is divided in the middle of the second flow path substrate 220 in the thickness direction so that a portion which is not bonded to the first flow path substrate 210 is separated from the second flow path substrate 220. Therefore, in this specific example, the second flow path substrate 220 can be easily made thin.

Figure 10:
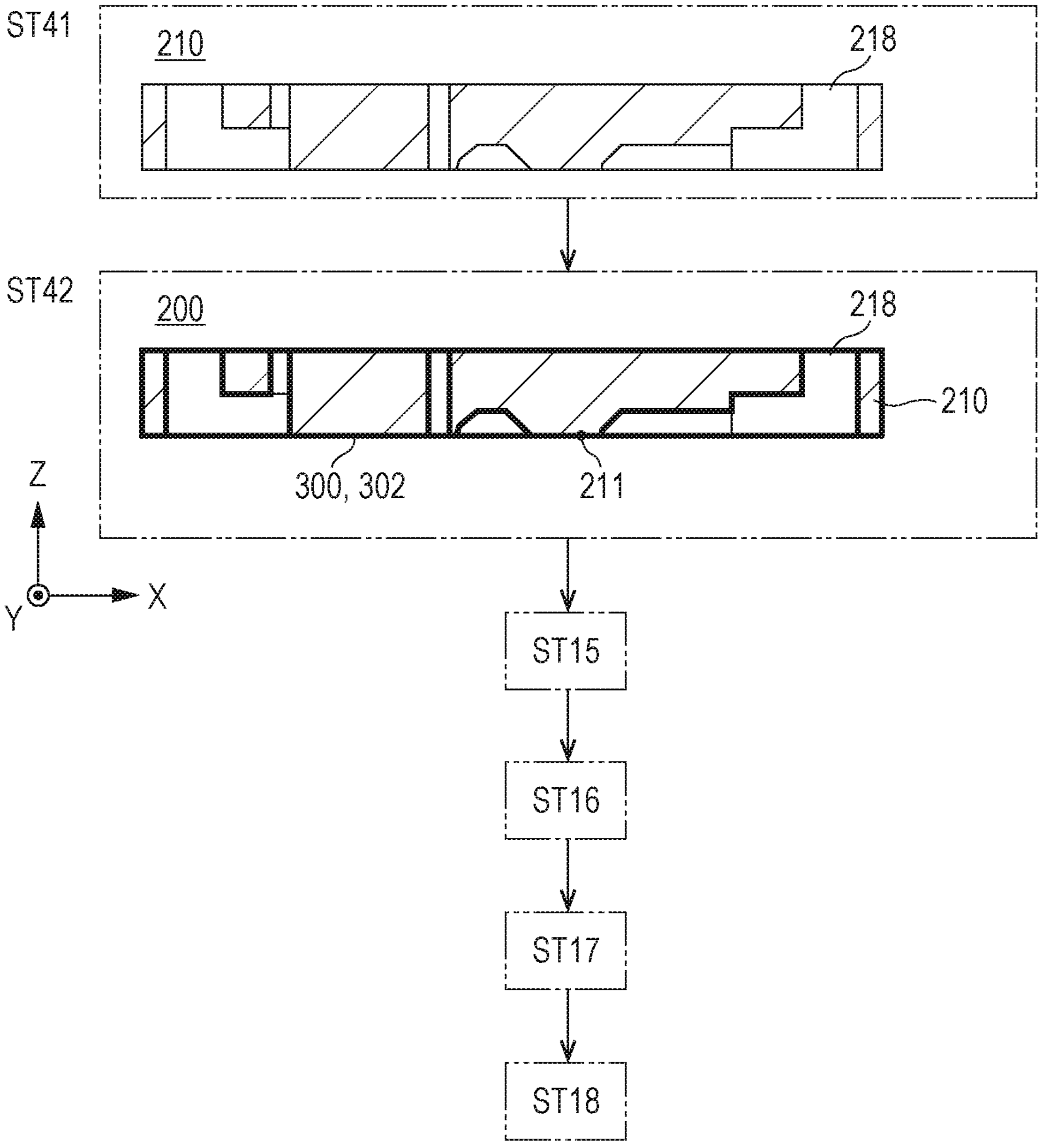
FIG. 10 is a sectional view schematically illustrating an example of forming a protective film on a first flow path substrate before bonding of a second flow path substrate.

After the thinning step ST16, a first protective film forming step ST17 is performed in which a first protective film 301 is formed on the surfaces of the first flow path substrate 210 and the second flow path substrate 220. As illustrated in FIG. 10, the protective film formed on the surface of the first flow path substrate 210 before bonding the first flow path substrate 210 and the second flow path substrate 220 is referred to as a second protective film 302. The protective film 300 is a general term for the first protective film 301 and the second protective film 302. In a case where a silicon substrate is used for the first flow path substrate 210 and the second flow path substrate 220, it is preferable to protect the flow path substrate from being eroded by the alkaline liquid LQ. The first protective film 301 is used to protect the first flow path substrate 210 and the second flow path substrate 220 from the liquid LQ. The protective film 300 that protects the flow path substrate from the alkaline liquid LQ preferably includes an oxide, a carbide, an oxynitride, or an acid carbide of any element selected from a group of Ta, Zr, Hf, Nb, Si, and Ti. From this, it is preferable to use a compound including any element selected from the group of Ta, Zr, Hf, Nb, Si, and Ti as a precursor used for forming the protective film 300.

In particular, the protective film 300 preferably includes any oxide selected from a group of tantalum oxide abbreviated as TaOx, hafnium oxide abbreviated as HfOx, and zirconium oxide abbreviated as ZrOx. TaOx is ditantalum pentoxide $Ta_2O_5$ in stoichiometric ratio, but it may actually deviate from x=2.5. TaOx has a characteristic that it is difficult to dissolve in an alkali and insoluble in an acidic solution other than hydrofluoric acid if the film density is, for example, as high as about 7 g/cm$^2$. Therefore, the protective film including TaOx is effective as a protective film against a strong alkaline solution or a strong acid solution. HfOx is hafnium dioxide $HfO_2$ in stoichiometric ratio, but it may actually deviate from x=2. HfOx has a characteristic of being insoluble in both alkali and acid. Therefore, the protective film including HfOx is versatile as a protective film against a strong alkaline solution or a strong acid solution. ZrOx is zirconium dioxide $ZrO_2$ in stoichiometric ratio, but it may actually deviate from x=2. ZrOx has a characteristic of being insoluble in alkali and insoluble in acidic solutions other than sulfuric acid and hydrofluoric acid. Therefore, the protective film including ZrOx is effective as a protective film against a strong alkaline solution or a strong acid solution.

The protective film 300 can be formed by one or more film forming methods selected from atomic layer deposition abbreviated as ALD, CVD, sputtering, and the like. In particular, if the protective film 300 is formed by ALD, the protective film 300 is formed on an inner surface of the liquid flow path having a complicated shape with a substantially uniform film thickness and good coverage, and is in a dense state with a high film density. In particular, the protective film 300 having the high film density is surely formed even in a region where coverage failure is likely to occur, such as a corner of the complicated liquid flow path 60 included in the circulation flow path 120, or the like. The formation of the protective film 300 by ALD is preferably performed at a temperature of 200° C. or lower, preferably 100° C. or lower, in order to suppress deterioration of the liquid ejecting head 10. Further, in order to suppress a reaction by-product, it is preferable that the protective film 300 is formed by ALD at a temperature of 50° C. or higher.

Since ALD is a method for facilitating film formation even in a hidden narrow portion, unlike film formation having high straightness such as sputtering, it is preferable to form the protective film 300 by ALD.

After the first protective film forming step ST17, a nozzle substrate bonding step ST18 is performed in which the thinned second flow path substrate 220 and the nozzle substrate 41 having the nozzle NZ are bonded. The nozzle substrate 41 can be formed from, for example, a wafer for a nozzle substrate, which is a silicon wafer. The method for forming the nozzle NZ on the wafer for the nozzle substrate is not particularly limited, and for example, the nozzle NZ is formed by etching the wafer for the nozzle substrate via a mask. For the bonding between the second flow path substrate 220 and the nozzle substrate 41, bonding with the adhesive, the above-mentioned direct bonding, or the like can be used.

In this specific example, since the thin second flow path substrate 220 has the liquid flow path 228 near the nozzle NZ, the flow path design of the narrow flow path portion near the nozzle NZ becomes easy.

The flow path component 200 having the first protective film 301 is divided into chips from a wafer state by any of dividing unit such as laser irradiation or blade dicing.

The pressure chamber substrate 33 illustrated in FIG. 3 can be formed from, for example, a wafer for the pressure chamber substrate, which is a silicon wafer. The method for forming the vibration plate 33*b* on the wafer for the pressure chamber substrate is not particularly limited, and for example, it is possible to provide a method for forming a silicon oxide layer as a vibration plate by applying one or more types selected from thermal oxidation, sputtering method, or the like to a wafer for the pressure chamber substrate, a method for forming an insulator layer such as a zirconium oxide layer on a silicon oxide layer by applying one or more types selected from a sputtering method, thermal oxidation, or the like on the silicon oxide layer. The method for forming the drive element 34 on the vibration plate 33*b* is not particularly limited, and for example, it is possible to provide a method for forming the first electrode layer, the piezoelectric layer, and the second electrode layer by applying one or more types selected from a sputtering method, a CVD method, a vapor deposition method, a liquid phase method, and the like. The method for forming the pressure chamber C1 on the wafer for the pressure chamber substrate is not particularly limited, and for example, the pressure chamber C1 is formed by etching the wafer for the pressure chamber substrate via a mask. For bonding the first flow path substrate 210 and the pressure chamber substrate 33, bonding with the adhesive, the above-mentioned direct bonding, or the like can be used.

The protective substrate 35 illustrated in FIG. 3 is bonded, for example, to the vibration plate 33*b* with the adhesive. The compliance substrate 42 illustrated in FIG. 3 is bonded, for example, to the end surface of the second flow path substrate 220 in the −Z direction by the adhesive. The housing member 36 illustrated in FIG. 3 is bonded, for example, to the end surface 221 of the first flow path substrate 210 in the +Z direction by the adhesive. Further, the wiring substrate 51 is coupled to the first electrode and the second electrode via the lead wiring.

As described above, the liquid ejecting head 10 including the flow path component 200 illustrated in FIG. 5 is manufactured. As illustrated in FIG. 1, the manufactured liquid ejecting head 10 is used for manufacturing the liquid ejecting apparatus 100 together with the supply section 14 of the liquid LQ, the transport section 22 of the medium MD, and the control section 20. Therefore, a specific example of a manufacturing method of the liquid ejecting apparatus 100 is also illustrated.

In this specific example, since the flow path substrates having through-holes and grooves formed as the liquid flow path 60 are bonded to each other, a complicated flow path such as a horizontal hole can also be formed. In this specific example, since the flow path substrate on one side can be made thin after bonding the flow path substrates to each other, the risk of chips or cracks that may occur when the thin flow path substrate is processed in a unit is suppressed. Since the SOI substrate is composed of Si and SiOx, this specific example has a degree of freedom in the process treatment method when forming a through-hole pattern or peeling off a resist mask.

As described above, the first flow path substrate 210 and the second flow path substrate 220 are directly bonded to each other without using the adhesive, and after the direct bonding, the second flow path substrate 220 is made thinner than the first flow path substrate 210. Since the first flow path substrate 210 and the second flow path substrate 220 are directly bonded, the second flow path substrate 220 is bonded to the first flow path substrate 210 with high accuracy. Further, since the second flow path substrate 220 is made thin in a state of being supported by the first flow path substrate 210, warpage of the second flow path substrate 220 or the like is prevented, and the thin second flow path substrate 220 having the flow paths 32*a* to 32*e* is formed with high accuracy. Therefore, in this specific example, it is possible to manufacture the liquid ejecting head 10 including the flow path component 200 where a thin layer having the liquid flow path is bonded to another layer with high accuracy.

Figure 6:
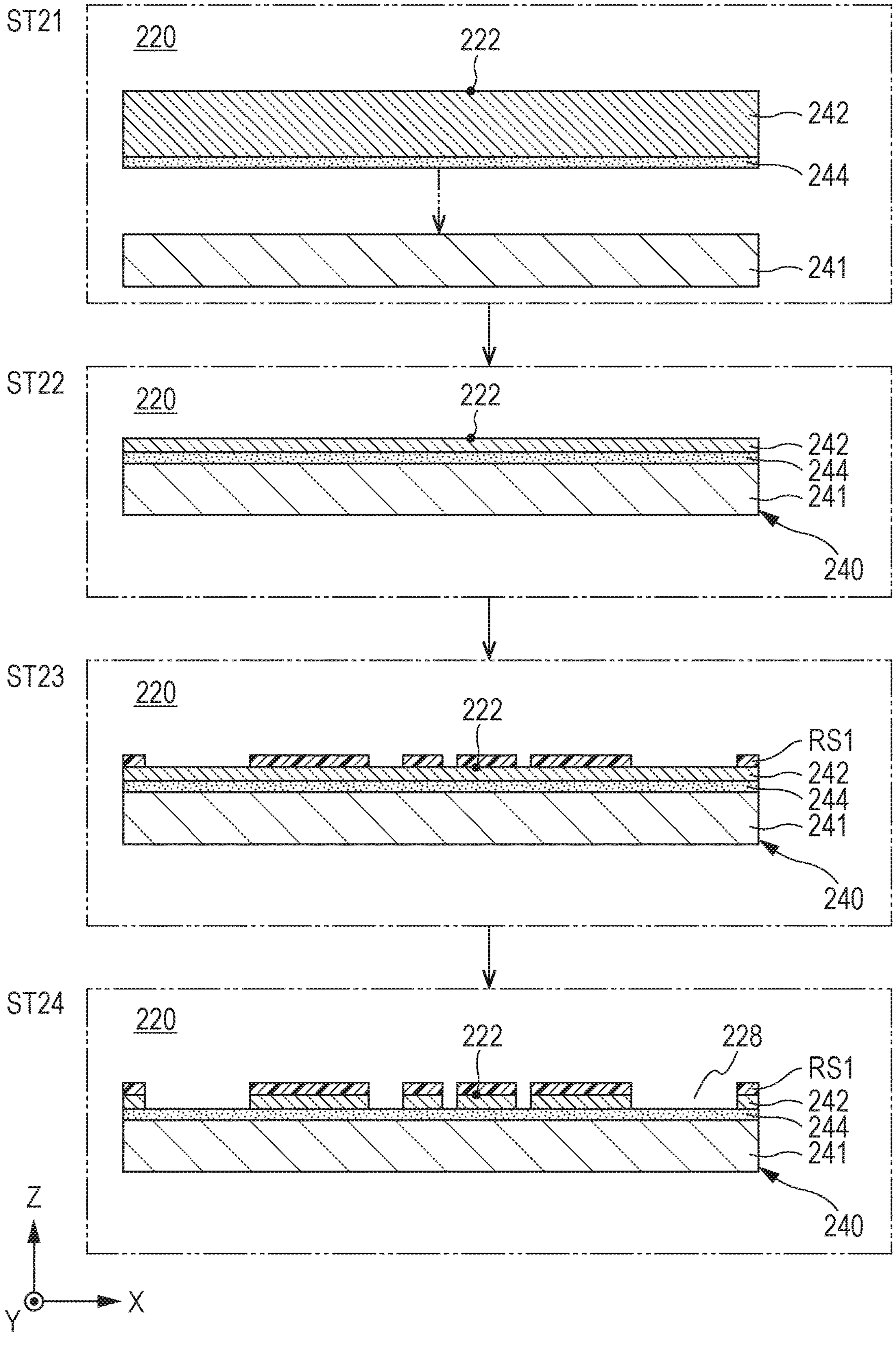
FIG. 6 is a sectional view schematically illustrating an example of manufacturing the liquid ejecting head using a glass substrate.

5. Second Specific Example of Manufacturing Method of Liquid Ejecting Head:

FIGS. 6 and 7 are sectional views schematically illustrating an example of manufacturing the liquid ejecting head 10 by using the stacked substrate 240 including the glass substrate 241 and the silicon substrate 242 as the second flow path substrate 220. The manufacturing method illustrated in FIGS. 6 and 7 includes steps ST21 to ST28.

The glass substrate 241 illustrated in FIG. 6 is a support substrate that supports the silicon substrate 242 when the liquid flow path is formed on the silicon substrate 242 or when the first flow path substrate 210 is directly bonded to the silicon substrate 242. Non-alkali glass, synthetic quartz glass, borosilicate glass, or the like can be used for the silicon substrate 242, and non-alkali glass is particularly preferable. In order to prevent warpage of the stacked substrate 240, it is preferable that a coefficient of thermal expansion of the glass substrate 241 is close to a coefficient of thermal expansion of the silicon substrate 242.

As the silicon substrate 242, a silicon polycrystalline substrate having a surface index of (110) or (111) can be used. The first flow path substrate 210 bonded to the silicon substrate 242 is preferably formed from a silicon single crystal substrate. In the first flow path substrate 210 illustrated in FIG. 7, the liquid flow path 218 is formed as the flow paths 31*a* to 31*f* by etching via a mask.

First, an adhesive layer forming step is performed in which the adhesive layer 244 is formed on one surface of the silicon substrate 242 which is a part of the stacked substrate 240 illustrated in FIG. 6. For example, in a case where a liquid adhesive to be the adhesive layer 244 is used, the adhesive layer 244 is formed by applying the liquid adhesive by a spin coating method. The formed adhesive layer 244 can reduce an adhesive force by irradiating with laser light. Further, the adhesive layer 244 can also be formed by attaching a double-sided tape to one surface of the silicon substrate 242. If the double-sided tape that is peeled off by gas generation by ultraviolet irradiation is used, it is possible to reduce the adhesive force of the adhesive layer 244 by the ultraviolet irradiation. As the double-sided tape, for example, a tape can be used in which a release film, a base material, and an adhesive layer are stacked in order. If the release film of the double-sided tape is bonded to one surface of the silicon substrate 242, the double-sided tape functions as the adhesive layer 244.

After that, a sticking step ST21 is performed in which the adhesive layer 244 and the glass substrate 241 are stuck. For example, the adhesive layer 244 and the glass substrate 241 can be stuck together by heat bonding. The stacked substrate 240 on which the sticking step ST21 is performed includes the adhesive layer 244 between the glass substrate 241 and the silicon substrate 242.

After the sticking step ST21, a stacked substrate thinning step ST22 is performed in which the silicon substrate 242 of the stacked substrate 240 is made thin according to the thickness of the second flow path substrate 220, for example, about 20 to 100 μm. The second surface 222, which is the end surface of the silicon substrate 242 in the +Z direction, is scraped. The silicon substrate 242 can be made thin by one or more types selected from CMP, grinding, and etching. The etching may be wet etching or dry etching. The surface roughness Ra of the second surface 222 to which the first flow path substrate 210 is bonded in the subsequent direct bonding step ST26 is preferably 1 nm or less. Therefore, it is preferable to form a mirror surface on the second surface 222 by performing a CMP treatment with a CMP apparatus. Further, in a case of combining grinding and CMP or combining etching and CMP, it is preferable to form a mirror surface by finally performing the CMP treatment on the second surface 222.

Next, a mask forming step ST23 is performed in which the pattern of the resist mask RS1 is formed on a portion of the second surface 222 of the silicon substrate 242, where the flow paths 32*a* to 32*e* are not formed, by using photolithography.

Next, a second liquid flow path forming step ST24 is performed in which the liquid flow path 228 is formed as the flow paths 32*a* to 32*e* on the silicon substrate 242 by etching the silicon substrate 242. The second liquid flow path forming step ST24 is an example of a liquid flow path forming step of forming a flow path longer than the thickness of the second flow path substrate on the second flow path substrate. The etching of the silicon substrate 242 may be wet etching or dry etching. For the wet etching, for example, anisotropic etching can be used by using an alkaline solution such as potassium hydroxide aqueous solution, TMAH aqueous solution, or EDP aqueous solution as an etchant. For the dry etching, for example, plasma dry etching can be used. In the second liquid flow path forming step ST24, the flow path longer than the thickness of the second flow path substrate 220 in a direction orthogonal to the Z-axis direction is formed on the second flow path substrate 220 as a part of the circulation flow path 120. By performing the second liquid flow path forming step ST24 of forming the flow path longer than the thickness of the second flow path substrate 220 in a direction intersecting the Z-axis direction as the flow paths 32*a* to 32*e* on the second flow path substrate 220, the flow path design of the narrow flow path portion near the nozzle NZ becomes easy. Further, since the flow path longer than the thickness of the second flow path substrate 220 is a part of the circulation flow path 120, in addition to facilitating the flow path design of the narrow flow path portion near the nozzle NZ, a design of the circulation flow path 120 or the like becomes easy.

Next, as illustrated in FIG. 7, a mask removing step ST25 is performed in which the resist mask RS1 is removed from the second surface 222. The resist mask RS1 can be removed by a chemical solution, oxygen plasma, or the like.

Next, a direct bonding step ST26 is performed in which the first surface 211 of the first flow path substrate 210 and the second surface 222 of the second flow path substrate 220 are directly bonded to each other without using the adhesive. As described above, by directly bonding the first flow path substrate 210 and the second flow path substrate 220 without using the adhesive, durability of a flow path component in which the substrates are bonded is improved, and good droplet ejection characteristics are maintained for a long period of time, and it is possible to form a complicated flow path structure that has a liquid circulation path.

It is preferable that the first surface 211, which is the end surface of the first flow path substrate 210 having the liquid flow path 218 in the −Z direction, is subjected to CMP in order to obtain a mirror surface. Further, in a case where the first surface 211 is scraped by combining grinding and CMP, or combining etching and CMP, it is preferable to use CMP finally. As described above, the direct bonding includes room temperature bonding, fusion bonding, and the like.

After the second liquid flow path forming step ST24, a direct bonding step ST26 is performed in which the first flow path substrate 210 and the silicon substrate 242 are directly bonded to each other without using the adhesive, so that bending of the second flow path substrate 220 is suppressed. Therefore, in this specific example, the liquid flow path 228 can be precisely processed while preventing the second flow path substrate 220 from warpage or the like, and the liquid flow path 228 can be formed with high accuracy.

After the direct bonding step ST26, a thinning step ST27 is performed in which the second flow path substrate 220 is made thinner than the first flow path substrate 210 with respect to the flow path component 200 where the first flow path substrate 210 and the second flow path substrate 220 are directly bonded. The thinning step ST27 can be performed, for example, by irradiating the stacked substrate 240 with light that weakens adhesion of the adhesive layer 244 from a glass substrate 241 side and separating the glass substrate 241 from the stacked substrate 240. If laser light is used as the light that weakens adhesion of the adhesive layer 244, the adhesive force of the adhesive layer 244 is reduced, so that the glass substrate 241 can be easily separated from the stacked substrate 240. A wavelength of the laser light can be between about 355 nm of ultraviolet rays and about 1064 nm of infrared rays. The adhesive remaining on the end surface 221 of the second flow path substrate 220 in the −Z direction is dissolved and removed by chemical cleaning. Further, in a case where the double-sided tape that is peeled off by gas generation due to ultraviolet irradiation is used for the adhesive layer 244, when the ultraviolet rays are used as the light for weakening the bonding of the adhesive layer 244, gas is generated from the adhesive layer of the double-sided tape due to the ultraviolet rays and the adhesive force of the adhesive layer is reduced. Therefore, the glass substrate 241 can be easily separated from the stacked substrate 240. Since the double-sided tape adhering to the silicon substrate 242 is bonded to the silicon substrate 242 in a release film, the double-sided tape can be easily peeled off from the silicon substrate 242.

In this specific example in which the thinning step ST16 described above is performed, the glass substrate 241 can be removed from the flow path component 200 without deteriorating the liquid flow path 60 of the flow path component 200.

As described above, in the manufacturing method of this specific example, in the thinning step ST27, a portion not bonded to the first flow path substrate 210 is separated from the second flow path substrate 220 by dividing the second flow path substrate 220 in the middle of the second flow path substrate 220 in the thickness direction. Therefore, in this specific example, the second flow path substrate 220 can be easily made thin.

After the thinning step ST27, a first protective film forming step ST28 is performed in which the first protective film 301 is formed on the surfaces of the first flow path substrate 210 and the second flow path substrate 220. As the first protective film 301, a material capable of being used for the protective film 300 described above can be used. The first protective film 301 can be formed by one or more film forming methods selected from ALD, CVD, sputtering, and the like, and it is preferable to be formed by ALD which can easily form a film even in a narrow portion of the liquid flow path.

After the first protective film forming step ST28, a nozzle substrate bonding step ST18 is performed in which the thinned second flow path substrate 220 and the nozzle substrate 41 having the nozzle NZ are bonded. The nozzle substrate bonding step ST18 is illustrated in FIG. 5. The flow path component 200 having the first protective film 301 is divided into chips from a wafer state by any of dividing unit such as laser irradiation or blade dicing.

Of course, for bonding the first flow path substrate 210 and the pressure chamber substrate 33, bonding with the adhesive, the above-mentioned direct bonding, or the like can be used. Further, if the protective substrate 35 illustrated in FIG. 3 is bonded to the vibration plate 33*b*, the compliance substrate 42 is bonded to the end surface 221 of the second flow path substrate 220 in the −Z direction, and the wiring substrate 51 is coupled to the first electrode and the second electrode via the lead wiring, the liquid ejecting head 10 including the flow path component 200 illustrated in FIG. 5 is manufactured. The manufactured liquid ejecting head 10 is used for manufacturing the liquid ejecting apparatus 100 illustrated in FIG. 1.

In this specific example, since the flow path substrates having through-holes and grooves formed as the liquid flow path 60 are bonded to each other, a complicated flow path such as a horizontal hole can also be formed. In this specific example, since the flow path substrate on one side can be made thin after bonding the flow path substrates to each other, the risk of chips or cracks that may occur when the thin flow path substrate is processed in a unit is suppressed.

As described above, the first flow path substrate 210 and the second flow path substrate 220 are directly bonded to each other without using the adhesive, and after the direct bonding, the second flow path substrate 220 is made thinner than the first flow path substrate 210. Since the first flow path substrate 210 and the second flow path substrate 220 are directly bonded, the second flow path substrate 220 is bonded to the first flow path substrate 210 with high accuracy. Further, since the second flow path substrate 220 is made thin in a state of being supported by the first flow path substrate 210, warpage of the second flow path substrate 220 or the like is prevented, and the thin second flow path substrate 220 having the flow paths 32*a* to 32*e* is formed with high accuracy. Therefore, in this specific example, it is possible to manufacture the liquid ejecting head 10 including the flow path component 200 where a thin layer having the liquid flow path is bonded to another layer with high accuracy.

Figure 9:
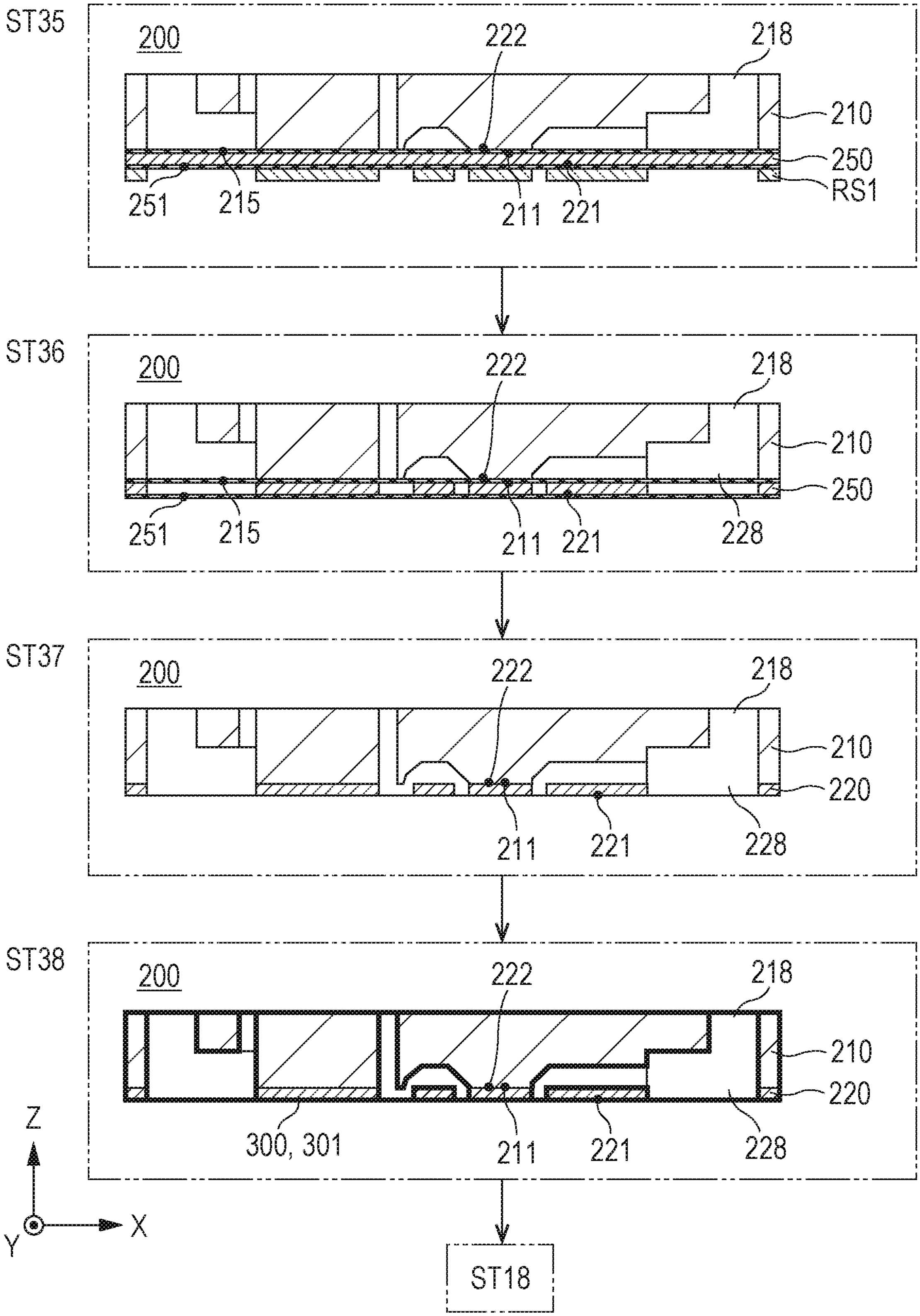
FIG. 9 is a sectional view schematically illustrating an example of manufacturing the liquid ejecting head using the silicon substrate having the silicon oxide layer on the surface.

6. Third Specific Example of Manufacturing Method of Liquid Ejecting Head:

FIGS. 8 and 9 are sectional views schematically illustrating an example of manufacturing the liquid ejecting head 10 by using the silicon substrate 250 having the silicon oxide layer 251 on the surface as the second flow path substrate 220. The manufacturing method illustrated in FIGS. 8 and 9 includes steps ST31 to ST38.

First, a first liquid flow path forming step ST31 is performed in which the liquid flow path 218 is formed as the flow paths 31*a* to 31*f* on the silicon substrate to be the first flow path substrate 210. The first flow path substrate 210 is obtained, for example, by forming the liquid flow path 218 by etching the silicon single crystal substrate having a surface index of (110) via a mask.

Next, a silicon oxide layer forming step ST32 is performed in which the silicon oxide layers 215 and 251 are formed on the surface of the first flow path substrate 210 having the liquid flow path 218 and the surface of the silicon substrate to be the second flow path substrate 220. The thickness of the silicon oxide layers 215 and 251 of the first flow path substrate 210 and the silicon substrate 250 is preferably 0.5 μm or more and more preferably 1 μm or more. In particular, the thickness of the silicon oxide layer 251 of the silicon substrate 250 is preferably 1 μm or more from the viewpoint of forming the liquid flow path 228 on the silicon substrate 250. Further, the thickness of the silicon oxide layers 215 and 251 is preferably 10 μm or less and more preferably 5 μm or less, from the viewpoint of suppressing the occurrence of warpage, cracks, or the like in the flow path component 200 due to the film stress of the silicon oxide layers 215 and 251. The formation of the silicon oxide layers 215 and 251 on the silicon substrate is preferably performed by thermal oxidation at a temperature of about 800 to 1200° C., and wet oxidation is preferable to dry oxidation.

The first surface 211 having the silicon oxide layer 215 in the first flow path substrate 210 and the second surface 222 having the silicon oxide layer 251 in the silicon substrate 250 may be subjected to CMP in order to obtain a mirror surface.

Next, a direct bonding step ST33 is performed in which the first surface 211 of the first flow path substrate 210 and the second surface 222 of the silicon substrate 250 are directly bonded to each other without using the adhesive. In the direct bonding step ST33 illustrated in FIG. 8, the silicon oxide layer 215 of the first flow path substrate 210 and the silicon oxide layer 251 of the silicon substrate 250 are directly bonded. As described above, by directly bonding the first flow path substrate 210 and the silicon substrate 250 without using the adhesive, durability of the flow path component in which the substrates are bonded is improved, good droplet ejection characteristics are maintained for a long period of time, and it is possible to form a complicated flow path structure that has a liquid circulation path. The direct bonding includes room temperature bonding, fusion bonding, or the like.

By performing the direct bonding step ST33 of directly bonding the first flow path substrate 210 and the silicon oxide layer 251 without using the adhesive, the bending of the second flow path substrate 220 is suppressed and the second flow path substrate 220 can be used as a stop layer in a subsequent second liquid flow path forming step ST36. Therefore, in this specific example, the liquid flow path 228 can be formed with high accuracy and an efficient manufacturing step can be provided.

After the direct bonding step ST33, a thinning step ST34 is performed in which the silicon substrate 250 is made thinner than the first flow path substrate 210 with respect to the flow path component 200 where the first flow path substrate 210 and the silicon substrate 250 are directly bonded. In the thinning step ST34, a treatment of thinning silicon substrate 250 is performed by one or more types selected from a group of grinding, etching, and CMP from the end surface 221 in the silicon substrate 250 on a side opposite to the second surface 222 which is the bonding surface with the first flow path substrate 210. The etching may be wet etching or dry etching. The silicon substrate 250 is made thin to, for example, about 20 to 100 μm. Since the silicon substrate 250 directly bonded to the first flow path substrate 210 is made thin by one or more types selected from the group of grinding, etching, and CMP, a variation in the thickness of the second flow path substrate 220 can be suppressed.

Next, as illustrated in FIG. 9, a mask forming step ST35 is performed in which the pattern of the resist mask RS1 is formed on a portion of the second surface 222 of the silicon substrate 250, where the flow paths 32*a* to 32*e* are not formed, by using photolithography.

Next, a second liquid flow path forming step ST36 is performed in which the liquid flow path 228 is formed as the flow paths 32*a* to 32*e* on the silicon substrate 250 by etching the silicon substrate 250 by using the silicon oxide layer 251 as the etching stop layer, and a mask removing step is performed in which the resist mask RS1 is removed from the second surface 222. FIG. 9 illustrates the flow path component 200 in a state where the resist mask RS1 is removed. The resist mask RS1 can be removed by ashing, a chemical solution, or the like. A second liquid flow path forming step ST36 is an example of a liquid flow path forming step of forming a flow path longer than the thickness of the second flow path substrate on the second flow path substrate. The etching of the silicon substrate 250 may be wet etching or dry etching. For the wet etching, for example, anisotropic etching can be used by using an alkaline solution such as potassium hydroxide aqueous solution, TMAH aqueous solution, or EDP aqueous solution as an etchant. For the dry etching, for example, plasma dry etching can be used. In the second liquid flow path forming step ST36, a flow path longer than the thickness of the second flow path substrate 220 in a direction orthogonal to the Z-axis direction is formed on the second flow path substrate 220 as a part of the circulation flow path 120. By performing the second liquid flow path forming step ST36 of forming the flow path longer than the thickness of the second flow path substrate 220 in the direction intersecting the Z-axis direction as the flow paths 32*a* to 32*e* on the second flow path substrate 220, the flow path design of the narrow flow path portion near the nozzle NZ becomes easy. Further, since the flow path longer than the thickness of the second flow path substrate 220 is a part of the circulation flow path 120, in addition to facilitating the flow path design of the narrow flow path portion near the nozzle NZ, a design of the circulation flow path 120 or the like becomes easy.

Next, a silicon oxide layer removing step ST37 is performed in which the exposed silicon oxide layer 251 is removed from the flow path component 200. Therefore, the manufacturing method of this specific example includes a silicon oxide layer removing step ST37 of removing the exposed silicon oxide layer 251 after the liquid flow path forming step. The silicon oxide layer removing step ST37 can be performed, for example, by dissolving the exposed silicon oxide layer 251 with an etchant. The exposed silicon oxide layer 251 can be removed from the flow path component 200 by, for example, wet etching using fluorinated acid as an etchant.

As described above, since the silicon oxide layer 251 required for direct bonding can be used as a stop layer in a subsequent step, the manufacturing step of this specific example is efficient. Further, by removing the silicon oxide layer 251 from the liquid flow path 218 of the first flow path substrate 210, the adhesion of the protective film 300 to the liquid flow path 218 is improved in a subsequent protective film forming step.

After the silicon oxide layer removing step ST37, a first protective film forming step ST38 is performed in which the first protective film 301 is formed on the surfaces of the first flow path substrate 210 and the second flow path substrate 220. As the first protective film 301, a material capable of being used for the protective film 300 described above can be used. The first protective film 301 can be formed by one or more film forming methods selected from ALD, CVD, sputtering, and the like, and it is preferable to be formed by ALD which can easily form a film even in a narrow portion of the liquid flow path.

After the first protective film forming step ST38, a nozzle substrate bonding step ST18 is performed in which the thinned second flow path substrate 220 and the nozzle substrate 41 having the nozzle NZ are bonded. The nozzle substrate bonding step ST18 is illustrated in FIG. 5. The flow path component 200 having the first protective film 301 is divided into chips from a wafer state by any of dividing unit such as laser irradiation or blade dicing.

Of course, for bonding the first flow path substrate 210 and the pressure chamber substrate 33, bonding with the adhesive, the above-mentioned direct bonding, or the like can be used. Further, if the protective substrate 35 illustrated in FIG. 3 is bonded to the vibration plate 33*b*, the compliance substrate 42 is bonded to the end surface 221 of the second flow path substrate 220 in the −Z direction, and the wiring substrate 51 is coupled to the first electrode and the second electrode via the lead wiring, the liquid ejecting head 10 including the flow path component 200 illustrated in FIG. 5 is manufactured. The manufactured liquid ejecting head 10 is used for manufacturing the liquid ejecting apparatus 100 illustrated in FIG. 1.

In this specific example, since the liquid flow path 228 is formed in the silicon substrate 250 after the first flow path substrate 210 in which the through-holes and grooves forming the flow paths 31*a* to 31*f* and the silicon substrate 250 are directly bonded, a complicated flow path such as a horizontal hole can be formed. In this specific example, since the silicon substrate 250 can be made thin after bonding the first flow path substrate 210 and the silicon substrate 250, a support substrate for transporting the flow path component 200 in a subsequent process becomes unnecessary and the cost can be reduced.

As described above, the first flow path substrate 210 and the second flow path substrate 220 are directly bonded to each other without using the adhesive, and after the direct bonding, the second flow path substrate 220 is made thinner than the first flow path substrate 210. Since the first flow path substrate 210 and the second flow path substrate 220 are directly bonded, the second flow path substrate 220 is bonded to the first flow path substrate 210 with high accuracy. Further, since the second flow path substrate 220 is made thin in a state of being supported by the first flow path substrate 210, warpage of the second flow path substrate 220 or the like is prevented, and the thin second flow path substrate 220 having the flow paths 32*a* to 32*e* is formed with high accuracy. Therefore, in this specific example, it is possible to manufacture the liquid ejecting head 10 including the flow path component 200 where a thin layer having the liquid flow path is bonded to another layer with high accuracy.

7. Fourth Specific Example of Manufacturing Method of Liquid Ejecting Head:

FIG. 10 is a sectional view schematically illustrating an example in which the second protective film 302 is formed on the first flow path substrate 210 before bonding of the second flow path substrate 220. In the manufacturing method illustrated in FIG. 10, the steps ST15 to ST18 of the first specific example illustrated in FIG. 5 are performed after steps ST41 and ST42.

First, a first liquid flow path forming step ST41 is performed in which the liquid flow path 218 is formed as the flow paths 31*a* to 31*f* on the silicon substrate to be the first flow path substrate 210. The first flow path substrate 210 is obtained, for example, by forming the liquid flow path 218 by etching the silicon single crystal substrate having a surface index of (110) via a mask.

Next, a second protective film forming step ST42 is performed in which the second protective film 302 is formed on the surfaces of the first flow path substrate 210 and the second flow path substrate 220. As the second protective film 302, a material capable of being used for the protective film 300 described above can be used. That is, the manufacturing method of this specific example includes the second protective film forming step ST42 of forming the protective film 300 including an oxide, a carbide, an oxynitride, or an acid carbide of any element selected from a group of Ta, Zr, Hf, Nb, Si, and Ti on the surface of the first flow path substrate 210 having the liquid flow paths 31*a* to 31*f*. The second protective film 302 can be formed by one or more types of film forming methods selected from ALD, CVD, sputtering, and the like, and it is preferable to be formed by ALD which can easily form a film even in a narrow portion of the liquid flow path.

Since it is difficult to form the protective film in the narrow portion of the liquid flow path 218, the protective film is likely to be formed even in the narrow portion of the liquid flow path 218 by forming the second protective film 302 even before bonding the first flow path substrate 210 and the second flow path substrate 220.

Next, as illustrated in FIG. 5, a direct bonding step ST15 is performed in which the first surface 211 of the first flow path substrate 210 and the second surface 222 of the second flow path substrate 220 are directly bonded to each other without using the adhesive. After the direct bonding step ST15, the thinning step ST16 is performed in which the second flow path substrate 220 is made thinner than the first flow path substrate 210 with respect to the flow path component 200 where the first flow path substrate 210 and the second flow path substrate 220 are directly bonded. After the thinning step ST16, a first protective film forming step ST17 is performed in which a first protective film 301 is formed on the surfaces of the first flow path substrate 210 and the second flow path substrate 220. After the first protective film forming step ST17, a nozzle substrate bonding step ST18 is performed in which the thinned second flow path substrate 220 and the nozzle substrate 41 having the nozzle NZ are bonded.

The direct bonding between the first flow path substrate 210 having the second protective film 302 and the second flow path substrate 220 can also be combined in the second specific example or the third specific example.

8. Modified Examples:

The printer as the liquid ejecting apparatus includes a copying machine, a facsimile machine, a multifunction device, and the like, in addition to a printing-only machine. Of course, the liquid ejecting apparatus is not limited to the printer.

The liquid ejected from the fluid ejecting head includes a fluid such as a solution in which a solute such as a dye is dissolved in a solvent, and a sol in which solid particles such as pigments and metal particles are dispersed in a dispersion medium. Such liquids include ink, liquid crystal, conductive material, solution of organic substance related to living organism, and the like. The liquid ejecting apparatus includes a color filter manufacturing apparatus for a liquid crystal display or the like, an electrode manufacturing apparatus for an organic EL display or the like, a biochip manufacturing apparatus, a manufacturing apparatus for forming wiring of a wiring substrate, and the like. Here, organic EL is an abbreviation for organic electroluminescence.

9. Conclusion:

As described above, according to the present disclosure, it is possible to provide a technology such as a manufacturing method of a liquid ejecting head including a flow path component in which a thin layer having a liquid flow path is bonded to another layer with high accuracy according to various aspects. Of course, the above-mentioned basic operations and effects can be obtained even with a technology consisting of only the constituent requirements according to the independent claims.

In addition, configurations in which the respective configurations disclosed in the above-mentioned examples are mutually replaced or combinations are changed, respective configurations in which known technologies and the configurations disclosed in the above-mentioned examples are mutually replaced or combinations are changed, and the like can also be implemented. The present disclosure also includes these configurations and the like.

What is claimed is:

1. A manufacturing method of a liquid ejecting head which has a nozzle and a liquid flow path having a pressure chamber to which a pressure for ejecting droplets from the nozzle is applied, and where a first substrate, in which a first liquid flow path is to be formed, and a second substrate, in which a second liquid flow path is to be formed, are bonded to each other, the method comprising:

directly bonding the first substrate and a first surface of the second substrate without using an adhesive;

thinning the second substrate so as to be thinner at a second surface, which is opposite the first surface, than the first substrate after directly bonding the first substrate and the second substrate; and bonding the second surface of the second substrate and a nozzle substrate having the nozzle.

2. The manufacturing method of a liquid ejecting head according to claim 1, wherein in directly bonding the first substrate and the second substrate, a first surface of the first substrate and the first surface of the second substrate are irradiated with either an ion beam or a neutron beam under vacuum to activate the first surface of the first substrate and the first surface of the second substrate, and the activated first surface of the first substrate and the activated first surface of the second substrate are in contact with each other to bond the first surface of the first substrate and the first surface of the second substrate.

3. The manufacturing method of a liquid ejecting head according to claim 1, wherein in directly bonding the first substrate and the second substrate, a hydroxyl group is formed on the first surface of the first substrate and the first surface of the second substrate, and the first surface of the first substrate and the first surface of the second substrate are bonded by heating the first surface of the first substrate having the hydroxyl group and the first surface of the second substrate having the hydroxyl group in a state of being in contact with each other.

4. The manufacturing method of a liquid ejecting head according to claim 1, wherein in thinning the second substrate, a portion which is not bonded to the first substrate is separated from the second substrate by dividing the second substrate in a middle of the second substrate in a thickness direction.

5. The manufacturing method of a liquid ejecting head according to claim 1, wherein in thinning the second substrate, the second substrate is made thin at the second surface by one or more types selected from a group of grinding, etching, and CMP from the second surface of the second substrate on a side opposite to the first surface of the second substrate with the first substrate.

6. The manufacturing method of a liquid ejecting head according to claim 1, wherein the second substrate is a stacked substrate including a glass substrate and a silicon substrate, the manufacturing method further comprises: forming a part of the liquid flow path on the silicon substrate by etching the silicon substrate, and after forming the liquid flow path, the first substrate and the silicon substrate are directly bonded to each other without using the adhesive.

7. The manufacturing method of a liquid ejecting head according to claim 6, wherein the stacked substrate includes an adhesive layer between the glass substrate and the silicon substrate, and in thinning the second substrate, the stacked substrate is irradiated with light that weakens adhesion of the adhesive layer from a glass substrate side to separate the glass substrate from the stacked substrate.

8. The manufacturing method of a liquid ejecting head according to claim 1, wherein the second substrate is an SOI substrate including a silicon oxide layer between a first silicon layer and a second silicon layer, the manufacturing method further comprises: forming a part of the liquid flow path on the first silicon layer by etching the first silicon layer by using the silicon oxide layer as an etching stop layer, and after forming the liquid flow path, the first substrate and the first silicon layer are directly bonded to each other without using the adhesive.

9. The manufacturing method of a liquid ejecting head according to claim 8, wherein in thinning the second substrate, the silicon oxide layer is dissolved by an etchant and the second silicon layer is separated from the SOI substrate.

10. The manufacturing method of a liquid ejecting head according to claim 1, wherein the second substrate is a silicon substrate having a silicon oxide layer at the first surface, and the first substrate and the silicon oxide layer are directly bonded to each other without using the adhesive.

11. The manufacturing method of a liquid ejecting head according to claim 10, wherein in thinning the second substrate, the silicon substrate is made thin by one or more types selected from a group of grinding, etching, and CMP from a surface of the silicon substrate on the second surface opposite to the first surface with the first substrate, and the manufacturing method further comprises:

forming a part of the liquid flow path on the second substrate by etching the second substrate by using the silicon oxide layer as an etching stop layer, after thinning the second substrate; and removing an exposed silicon oxide layer, after forming the liquid flow path.

12. The manufacturing method of a liquid ejecting head according to claim 1, further comprising:

forming a protective film including oxide, carbide, oxynitride, or acid carbide of any element selected from a group of Ta, Zr, Hf, Nb, Si, and Ti on surfaces of the first substrate and the second substrate, after directly bonding the first substrate and the second substrate.

13. The manufacturing method of a liquid ejecting head according to claim 12, wherein the protective film is formed by atomic layer deposition.

14. The manufacturing method of a liquid ejecting head according to claim 1, further comprising:

forming a protective film including oxide, carbide, oxynitride, or acid carbide of any element selected from a group of Ta, Zr, Hf, Nb, Si, and Ti on a surface of the first substrate having a part of the liquid flow path, wherein in directly bonding the first substrate and the second substrate, the first substrate having a second protective film and the second substrate are directly bonded to each other without using an adhesive.

15. The manufacturing method of a liquid ejecting head according to claim 1, further comprising:

forming a flow path longer than a thickness of the second substrate in a direction intersecting with a thickness direction of the second substrate on the second substrate as a part of the liquid flow path.

16. The manufacturing method of a liquid ejecting head according to claim 15, wherein the liquid flow path includes a part of a circulation flow path for circulating a liquid passing through the pressure chamber, and the flow path longer than the thickness of the second substrate is a part of the circulation flow path.

17. A manufacturing method of a flow path component which has a liquid flow path and where a first substrate, in which a first liquid flow path is to be formed, and a second substrate, in which a second liquid flow path is to be formed, are bonded to each other, the method comprising:

directly bonding the first substrate and a first surface of the second substrate without using an adhesive;

thinning the second substrate so as to be thinner at a second surface, which is opposite the first surface, than the first substrate after the directly bonding the first substrate and the second substrate; and bonding the second surface of the second substrate and a nozzle substrate having the nozzle.

* * * * *